US009459817B2

United States Patent
Shiohara et al.

(10) Patent No.: US 9,459,817 B2
(45) Date of Patent: Oct. 4, 2016

(54) RECORDING CONTROL SYSTEM, CONTROL METHOD OF A RECORDING CONTROL SYSTEM, AND RECORDING DEVICE

(71) Applicant: Seiko Epson Corporation, Tokyo (JP)

(72) Inventors: Susumu Shiohara, Nagano-ken (JP); Toshihiro Tsukada, Nagano-ken (JP); Toshifumi Yamaji, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 233 days.

(21) Appl. No.: 14/085,053

(22) Filed: Nov. 20, 2013

(65) Prior Publication Data

US 2014/0146333 A1 May 29, 2014

(30) Foreign Application Priority Data

Nov. 26, 2012 (JP) ................................ 2012-257154
Nov. 26, 2012 (JP) ................................ 2012-257155

(51) Int. Cl.
*G06F 3/12* (2006.01)

(52) U.S. Cl.
CPC .......... *G06F 3/1208* (2013.01); *G06F 3/1243* (2013.01); *G06F 3/1257* (2013.01); *G06F 3/1285* (2013.01)

(58) Field of Classification Search
None
See application file for complete search history.

(56) References Cited

U.S. PATENT DOCUMENTS 6,498,657 B1 * 12/2002 Kuntz .................. G06F 17/211 358/1.1
7,460,252 B2 * 12/2008 Campbell ........... G06K 15/021 358/1.1
7,460,921 B2 * 12/2008 Sullivan ............... B65B 61/025 264/401
2005/0099442 A1 * 5/2005 Payne ................. G06K 15/007 347/14
2011/0157226 A1 * 6/2011 Ptucha ................... G06T 11/60 345/638

FOREIGN PATENT DOCUMENTS

| | | |
|---|---|---|
| JP | 06-328790 | 11/1994 |
| JP | 2000-056685 | 2/2000 |
| JP | 2002-037420 | 2/2002 |
| JP | 2005-305843 | 11/2005 |
| JP | 2006-172188 | 6/2006 |
| JP | 2012-048415 | 3/2012 |

* cited by examiner

*Primary Examiner* — Marivelisse Santiago Cordero
*Assistant Examiner* — Neil R McLean

(57) ABSTRACT

Using the ability to print according to a template, a recording device adds value to the printed output. A printer in a recording control system stores area definition data defining areas in each of a plurality of templates composed of one or more printing areas. When a control command is received from a host computer, the printer records images in areas of a template based on the area definition data of the areas in the specified template. To record images related to a particular product with the printer, the host computer gets product information related to the product, and generates and sends a control command to convert and record information related to a specific area in the template based on the product information.

19 Claims, 12 Drawing Sheets

FIELD A1
¥100
AOMORI APPLES
FRESH AOMORI APPLES
RED

| TEMPLATE NAME | FIELD NAME | FIELD REFERENCE COORDINATES | SIZE | BORDER VALUE | BACKGROUND COLOR | FIELD ATTRIBUTE |
|---|---|---|---|---|---|---|
| TEMPLATE T1 | FIELD A1 | (X1, Y1) | (W1, H1) | BLACK | NONE | PRODUCT NAME |
| | FIELD A2 | (X2, Y2) | (W2, H2) | BLACK | NONE | PRICE |
| | FIELD A3 | (X3, Y3) | (W3, H3) | BLACK | NONE | BARCODE |
| | FIELD A4 | (X4, Y4) | (W4, H4) | BLACK | NONE | FREE AREA |

24

| PRODUCT CODE | FIRST THRESHOLD VALUE TA1 | SECOND THRESHOLD VALUE TA2 |
|---|---|---|
| CODE C1 | 10 | 50 |
| CODE C2 | 30 | 100 |
| CODE C3 | 20 | 60 |
| ⋮ | ⋮ | ⋮ |

FIG. 6

| TEMPLATE NAME | FIELD NAME | FIELD REFERENCE COORDINATES | SIZE | BORDER VALUE | BACKGROUND COLOR | FIELD ATTRIBUTE |
|---|---|---|---|---|---|---|
| TEMPLATE T2 | FIELD A1 | (Xa1, Ya1) | (Wa1, Ha1) | BLACK | NONE | PRODUCT NAME |
| | FIELD A2 | (Xa2, Ya2) | (Wa2, Ha2) | BLACK | NONE | MANUFACTURER |
| TEMPLATE T3 | FIELD B1 | (Xb1, Yb1) | (Wb1, Hb1) | BLACK | NONE | PRODUCT NAME |
| | FIELD B2 | (Xb2, Yb2) | (Wb2, Hb2) | BLACK | NONE | PRICE |
| | FIELD B3 | (Xb3, Yb3) | (Wb3, Hb3) | BLACK | NONE | BARCODE |

RECORDING CONTROL SYSTEM, CONTROL METHOD OF A RECORDING CONTROL SYSTEM, AND RECORDING DEVICE

CROSS REFERENCE TO RELATED APPLICATIONS

This application claims priority under 35 U.S.C. §119 to Japanese Application No. 2012-257154, filed Nov. 26, 2012, and Japanese Patent Application No. 2012-257155 filed Nov. 26, 2012. The content of each such application is incorporated in its entirety herein by reference.

BACKGROUND

1. Technical Field

The present invention relates to a recording control system including a control device and a recording device that can connect to the control device, to a control method of the recording control system, and to the recording device.

2. Related Art

Systems having recording devices, such as printers, that record using predefined templates are known from literature. See, for example, Japanese Unexamined Patent Appl. Pub. JP-A-2012-048415. This type of recording device records according to a template based on control commands input from a control device.

Because the recording device in such systems can record based on templates, there is a desire to use this ability of the recording device to record based on templates to add value to the recorded output (printout)), such as to record images that improve user convenience.

SUMMARY

The present invention therefore uses the ability of the recording device to record based on templates to add value to the printed output.

Example 1

One aspect of the invention is a recording control system including a control device, and a recording device that can connect to the control device, and records an image related to a product on a recording medium as controlled by the control device. The recording device includes a storage unit that stores area definition data defining each area in each of a plurality of templates composed of one or a plurality of areas that are formed in the printable area of the recording medium; and a recording execution unit that, when a control command specifying a particular template and instructing recording images in areas of the specified template is received from the control device, records the images in the areas according to the template based on the area definition data of the areas in the specified template. The control device includes a recording control unit that acquires product information related to one product, and generates and sends a control command to convert and record information related to a specific area in one template based on the product information, when controlling the recording device to record an image related to the one product on the recording medium according to the one template.

This aspect of the invention converts and records information related to a specific area of a specific template based on product information for a particular product. By thus converting information related to a specific area in the group of areas formed on the recording medium so that the information is easy to read, the user can easily and accurately know the inventory status of the product, and user convenience is thereby improved. More specifically, value can be added to the printed output.

Example 2

In a recording control system according to another aspect of the invention, the recording device has a recording head capable of color printing. When controlling the recording device to record an image related to one product on the recording medium according to one template, the recording control unit of the control device acquires information related to the inventory of the one product, and generates and outputs a control command including information to convert the color of a specific area of the one template to a specific color for printing according to the inventory status of the one product.

In this aspect of the invention, the color of a specific area in the group of areas forming the template is converted to and recorded using a specific color according to the inventory status of the product. As a result, by seeing the color of the specific area in the areas formed on the recording medium, the user can easily and accurately know the inventory status of the product, and user convenience is thereby improved. More specifically, value can be added to the printed output.

Example 3

In a recording control system according to another aspect of the invention, when controlling the recording device to record an image related to one product on the recording medium according to one template, the recording control unit of the control device acquires the inventory level of the one product, and generates and outputs a control command including information to convert the color of a specific area of the one template to a specific color for printing according to whether the inventory of the product is high or low.

This aspect of the invention enables the user to easily and accurately know if the inventory of the product is high or low by simply seeing the color of the specific area in the areas formed on the recording medium, and user convenience is thereby improved.

Example 4

In a recording control system according to another aspect of the invention, the recording control unit of the control device acquires the inventory level of the one product based on data related to inventory management stored by the recording control unit, or acquires the inventory level of the one product by querying a server that manages product inventory.

This aspect of the invention enables the recording control unit of the control device to appropriately acquire the inventory level of the product.

Example 5

In a recording control system according to another aspect of the invention, when controlling the recording device to record an image related to one product on the recording medium according to one template, the recording control unit of the control device acquires the rate of decrease in the inventory of the one product, and generates and outputs a control command including information to convert the color of a specific area of the one template to a specific color for printing according to the rate of decrease in the inventory of the one product.

This aspect of the invention enables the user to easily and accurately know the rate of decrease in the inventory of the product by simply seeing the color of the specific area in the areas formed on the recording medium, and user convenience is thereby improved.

Example 6

In a recording control system according to another aspect of the invention, the recording control unit of the control device acquires the rate of decrease in the inventory of the one product based on data related to inventory management stored by the recording control unit, or acquires information related to the inventory of the one product by querying a server that manages product inventory, and calculates the rate of decrease in the inventory of the one product based on the acquired information, or acquires the rate of decrease in the inventory of the one product by querying a server that manages product inventory and has a function that calculates the rate of decrease in the inventory of a product.

This aspect of the invention enables the recording control unit of the control device to appropriately acquire the rate of decrease in the inventory of the product.

Example 7

In a recording control system according to another aspect of the invention, the process of converting the color of a specific area in one template to a specific color includes at least one of a process that converts the color of the border of the specific area to a specific color, and a process that converts the color of the background of the specific area to a specific color.

Using the ability to record according to a template composed of one or more areas (fields), this aspect of the invention can effectively change the color of a particular area to a specific color.

Example 8

In a recording control system according to another aspect of the invention, the recording device has a recording head capable of color printing. When controlling the recording device to record an image related to one product on the recording medium according to one template, the recording control unit of the control device acquires distribution information related to the distribution of the one product, and generates and outputs a control command including information to convert the color of a specific area of the one template to a specific color for printing based on the distribution information.

In this aspect of the invention, the color of a specific area in the group of areas forming the template is converted to and recorded using a specific color based on distribution information related to distribution of the product. As a result, by seeing the color of the specific area in the areas formed on the recording medium, the user can easily and accurately acquire information about the distribution of the product, and user convenience is thereby improved. More specifically, value can be added to the printed output.

Distribution information related to distribution of a product as used herein is information related to the distribution channel from production of the product to sale to the consumer, including but not limited to information about the manufacturer (producer) and information about the distribution channel. A product as used herein conceptually includes any product that may ultimately be sold in a store, including agricultural products, seafood and marine products, electronics and electrical appliances, books, and processed foods.

Example 9

In a recording control system according to another aspect of the invention, the distribution information includes information related to the correctness of at least one of the distribution channel, storage time, storage temperature, and manufacturer of the product. When controlling the recording device to record an image related to one product on the recording medium according to one template, the recording control unit of the control device acquires the distribution information, and generates and outputs a control command including information to convert the color of a specific area of the one template to a specific color for printing according to the correctness of the distribution channel, storage time, storage temperature, or manufacturer of the product.

This aspect of the invention enables the user to easily and accurately acquire information related to the correctness of at least one of the distribution channel, storage time, storage temperature, and manufacturer of the product by simply seeing the color of the specific area in the areas formed on the recording medium, and user convenience is thereby improved.

Example 10

In a recording control system according to another aspect of the invention, the distribution information includes information related to the correctness of at least one of the expiration date and the processor of the product. When controlling the recording device to record an image related to one product on the recording medium according to one template, the recording control unit of the control device acquires the distribution information, and generates and outputs a control command including information to convert the color of a specific area of the one template to a specific color for printing according to the correctness of the expiration date or the processor of the product.

This aspect of the invention enables the user to easily and accurately acquire information related to the correctness of the expiration date or the processor of the product by simply seeing the color of the specific area in the areas formed on the recording medium, and user convenience is thereby improved.

Example 11

In a recording control system according to another aspect of the invention, the process of converting the color of a specific area in one template to a specific color includes at least one of a process that converts the color of the border of the specific area to a specific color, and a process that converts the color of the background of the specific area to a specific color.

Using the ability to record according to a template composed of one or more areas (fields), this aspect of the invention can effectively change the color of a particular area to a specific color.

Example 12

Another aspect of the invention is a recording device that can connect to a control device, and records an image related to a product on a recording medium as controlled by the control device, the recording device including, a storage unit that stores area definition data defining each area in each of a plurality of templates composed of one or a plurality of areas that are formed in the printable area of the recording medium; and a recording control unit that, when a control command that is a control command to record an image related to one product, specifies a particular template, and instructs recording images in areas of the specified template is received from the control device, records the images in the areas according to the template based on the area definition data of the areas in the specified template, and acquires product information related to the one product, and converts and records information related to a specific area in the one template based on the product information.

This aspect of the invention converts and records information related to a specific area of a specific template based on product information for a particular product.

By thus converting information related to a specific area in the group of areas formed on the recording medium so that the information is easy to grasp, the user can easily and accurately know the inventory status of the product, and user convenience is thereby improved. More specifically, value can be added to the printed output.

Example 13

A recording device according to another aspect of the invention preferably also has a recording head capable of color printing. When a control command that is a control command to record an image related to one product, specifies a particular template, and instructs recording images in areas of the specified template is received from the control device, the recording control unit controls the recording head and records the images in the areas according to the template based on the area definition data of the areas in the specified template, and acquires information related to the inventory of the one product, and converts the color of a specific area of the one template to a specific color for printing according to the inventory status of the one product.

In this aspect of the invention, the color of a specific area in the group of areas forming the template is converted to and recorded using a specific color according to the inventory status of the product. As a result, by seeing the color of the specific area in the areas formed on the recording medium, the user can easily and accurately know the inventory status of the product, and user convenience is thereby improved. More specifically, value can be added to the printed output.

Example 14

A recording device according to another aspect of the invention also has a recording head capable of color printing. When a control command that is a control command to record an image related to one product, specifies a particular template, and instructs recording images in areas of the specified template is received from the control device, the recording control unit controls the recording head and records the images in the areas according to the template based on the area definition data of the areas in the specified template, and acquires distribution information related to the distribution of the one product, and converts the color of a specific area of the one template to a specific color for printing based on the distribution information.

In this aspect of the invention, the color of a specific area in the group of areas forming the template is converted to and recorded using a specific color based on distribution information related to distribution of the product. As a result, by seeing the color of the specific area in the areas formed on the recording medium, the user can easily and accurately acquire information about the distribution of the product, and user convenience is thereby improved. More specifically, value can be added to the printed output.

Example 15

Another aspect of the invention is a control method of a recording control system including a control device, and a recording device that can connect to the control device, and records an image related to a product on a recording medium as controlled by the control device, the control method including: the recording device storing area definition data defining each area in each of a plurality of templates composed of one or a plurality of areas that are formed in the printable area of the recording medium, and recording images in areas according to a template based on the area definition data of the areas in the specified template when a control command specifying a particular template and instructing recording images in areas of the specified template is received from the control device; and the control device acquiring product information related to one product, and generating and sending a control command to convert and record information related to a specific area in one template based on the product information, when controlling the recording device to record an image related to the one product on the recording medium according to the one template.

With this method, information related to a specific area of a specific template is converted and recorded based on the inventory status of the product. As a result, information related to a specific area in the group of areas formed on the recording medium can be made easy to check, the inventory status of the product can be known easily and accurately, and user convenience is improved. More specifically, value can be added to the printed output.

Example 16

In a control method of a recording control system according to another aspect of the invention, the recording device has a recording head capable of color printing; and controls the recording head and records images in areas according to a template based on the area definition data of the areas in the specified template when a control command specifying a particular template and instructing recording images in areas of the specified template is received from the control device. The control device, when controlling the recording device to record an image related to one product on the recording medium according to one template, acquires information related to the inventory of the one product, and generates and outputs a control command including information to convert the color of a specific area of the one template to a specific color for printing according to the inventory status of the one product.

With this method, the color of a specific area of the template is converted to a specific color and recorded based on the inventory status of the product. As a result, the user can easily and accurately know the inventory status of the product by checking the color of a specific area in the plural areas formed on the recording medium, and user convenience is improved. More specifically, value can be added to the printed output.

Example 17

In a control method of a recording control system according to another aspect of the invention, the recording device has a recording head capable of color printing; and controls the recording head and records images in areas according to a template based on the area definition data of the areas in the specified template when a control command specifying a particular template and instructing recording images in areas of the specified template is received from the control device. The control device, when controlling the recording device to record an image related to one product on the recording medium according to one template, acquires distribution information related to the distribution of the one product, and generates and outputs a control command including information to convert the color of a specific area of the one template to a specific color for printing based on the distribution information.

With this control method, the color of a specific area in the group of areas in the template is converted to and recorded using a specific color based on distribution information related to distribution of the product. As a result, by seeing the color of the specific area in the areas formed on the recording medium, the user can easily and accurately acquire information about the distribution of the product, and user convenience is thereby improved. More specifically, value can be added to the printed output.

Effect of the Invention

Using the ability of the recording device to record based on a template, the invention adds value to the printed output.

Objects of the present invention are further met in an image recording system that includes: a host device configured to have product data identifying a specific product; and an image recording device responsive to the host device for recording product information on an image recording medium in accordance with the product data provided by the host device and a selected one of a plurality of image layout templates, the selected template being specified by the host device, the image recording device including: (a) a storage unit storing the plurality of templates, each template in the plurality of image layout templates having at least one imaging region and being defined by a respective set of area definition data fields that define the imaging regions of each respective template including default settings for the imaging regions, and (b) a recording execution unit recording on the image recording medium the product information according to the received product data and the area definition data fields of the selected template; wherein the host device includes a recording control unit that acquires additional descriptive data related to the specific product, and prior to the image recording device recording the product information on the image recording medium, the recording control unit selectively instructs the image recording device to alter the default settings of at least one imaging region of the selected template to alternate settings that reflect information extracted from the additional descriptive data.

In this approach, the image recording device has a recording head capable of color printing, the additional descriptive data includes inventory information related to the inventory of the specific product, and the recording control unit instructs the image recording device to alter a default color setting of the at least one imaging region of the selected template to an alternate color setting indicative of the inventory status of the specific product as determined from the inventory information.

Further preferably, the additional descriptive data is acquired from a data store within the host device, the descriptive product is a commercial product, and the alternate settings are predefined within the selected template.

Also in this approach, the additional descriptive data may be acquired from a remote server that manages product inventory.

Preferably, the additional descriptive data includes the rate of decrease in the inventory of the specific product, and the recording control unit instructs the image recording device to alter a default color setting of the at least one imaging region of the selected template to an alternate color setting indicative of the rate of decrease in the inventory of the specific product.

Following this preferred embodiment, the additional descriptive data may also be acquired from a remote server that manages product inventory, and calculates the rate of decrease in the inventory of the specific product based on product inventory information acquired from the remote server. The recording control unit may also instruct the image recording device to alter a default color setting of the at least one imaging region of the selected template to an alternate color setting indicative of the inventory status of the specific product as determined from the inventory information.

Additionally, within the at least one imaging region, at least one of its border or background is altered from its default color setting to the alternate color setting.

In the above preferred embodiment, the image recording device preferably has a recording head capable of color printing. Furthermore, the additional descriptive data includes distribution information related to the distribution of the specific product, and the recording control unit instructs the image recording device to alter a default color setting of the at least one imaging region of the selected template to an alternate color setting indicative of the distribution information.

In this approach, the distribution information includes information related to whether the distribution path of the specific product met requirements of at least one of the distribution channel, storage time, storage temperature, or manufacturer of the product; and the recording control unit instructs the image recording device to alter a default color setting of the at least one imaging region of the selected template to an alternate color setting indicative of whether the distribution path of the specific product met requirements of distribution channel, storage time, storage temperature, or manufacturer of the product.

In this preferred recording control system, the additional descriptive data may include information related to the expiration date and the product processor of the specific product. The recording control unit may then instruct the image recording device to alter a default color setting of the at least one imaging region of the selected template to an alternate color setting indicative of the proximity of the expiration date or the specific produced was processed by an approved product processor.

Additionally within the at least one imaging region, at least one of its border or background is altered from its default color setting to the alternate color setting.

The present objects may also be met in an image recording device that is responsive to a host device, and records on a recording medium an image related to a commercial product as directed by the host device. The image recording device preferably includes: a storage unit storing a plurality of image layout templates, each template of the plurality of image layout templates having at least one imaging region and being defined by a respective set of area definition data fields that define the imaging regions of each respective template including default settings for the imaging regions; and a recording control unit that, in response to the host device directing the image recording device to follow a specified one of the templates to record first image data representative of a first set of descriptive data provided by the host device and corresponding to the commercial product, acquires a second set of descriptive data corresponding to the commercial product, and based on the second set of descriptive data selectively alters the default settings of at least one imaging region of the specified template to alternate settings to define an altered specified template that further reflects information extracted from the second set of description data, and records the first image data according to the altered specified template.

Preferably, this image recording device further includes a recording head capable of color printing. In this case, the second set of descriptive data may include inventory information of the commercial product, and the recording control unit may alter a default color setting of the at least one imaging region of the specified template to an alternate color setting indicative of the inventory status of the commercial product as determined from the inventory information.

Preferably within the at least one imaging region, at least one of its border or background is altered from its default color setting to the alternate color setting.

The present recording device may include a recording head capable of color printing, and the second set of descriptive data may include distribution information related to the distribution of the commercial product. In this case, the recording control unit may alter a default color setting of the at least one imaging region of the specified template to an alternate color setting indicative of the distribution information.

Preferably within the at least one imaging region, at least one of its border or background is altered from its default color setting to the alternate color setting.

Objects of the present invention may also be met in a control method of an image recording control system including a host device in communication with an image recording device that records on a recording medium an image related to a commercial product as directed by the host device. This preferred control method includes the following steps: (A) storing within the image recording device a plurality of image layout templates, each template of the plurality of image layout templates having at least one imaging region and being defined by a respective set of area definition data fields that define the imaging regions of each respective template including default settings for the imaging regions; (B) submitting first set of descriptive data related to the commercial product to the host device and identifying one template within the plurality of image layout templates; (C) having the host device generate first image data representative of the first set of descriptive data and arranged for recording in accordance with the identified template; (D) having the host device access a second set of descriptive data related to the commercial product, and based on the second set of descriptive data selectively altering the default settings of at least one imaging region of the identified template to alternate settings that further reflect information extracted from the second set of description data; (E) having the host device transmit recording commands to the image recording device, the recording commands directing the image recording device to record the first image data in accordance with the identified template and alternate settings; and (F) in response to receiving the recording commands, having the image recording device record the on the recording medium the first image data in accordance with the identified template and alternate settings.

In this control method, the image recording device preferably has a recording head capable of color printing, and the second set of descriptive data includes inventory information of the commercial product. In his case, in step (D), the host device may selectively alter a default color setting of the at least one imaging region of the identified template to an alternate color setting indicative of the inventory status of the commercial product as determined from the inventory information.

Again in this control method, if the image recording device has a recording head capable of color printing, the second set of descriptive data may include distribution information related to the distribution of the commercial product. In this case, in step (D), the host device may selectively alter a default color setting of the at least one imaging region of the identified template to an alternate color setting indicative of the distribution information.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 schematically shows the content of an inventory count threshold table.

DESCRIPTION OF EMBODIMENTS

Embodiment 1

A first embodiment of the present invention is described below with reference to the accompanying figures. Note that the scale and size of members and parts shown in the figures referenced below may differ from the actual scale and size for convenience of description and illustration.

Configuration of a Recording Control System

Figure 1:
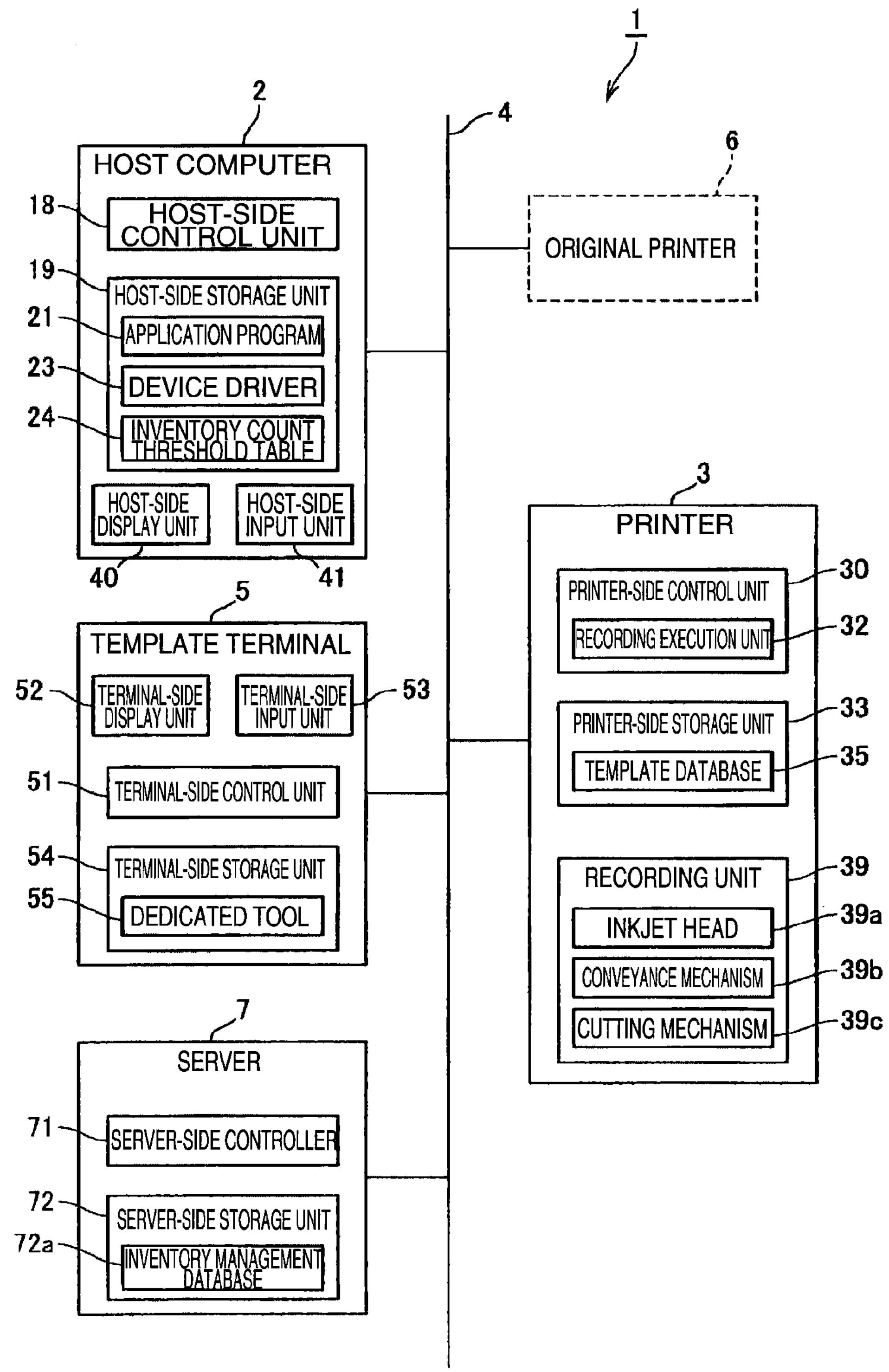
FIG. 1 is a function block diagram showing the configuration of a recording control system according to a first embodiment of the invention.

The configuration of a recording control system according to a first embodiment of the invention is described below with reference to FIG. 1. FIG. 1 is a function block diagram showing the configuration of a recording control system according to the first embodiment of the invention. The recording control systems described in the first to third embodiments use inventory information related to product inventory control as product information (i.e. product data).

As shown in FIG. 1, a recording control system 1 according to this embodiment of the invention includes a host computer 2 (e.g. control device, host device, or host computing device) and a printer 3 (recording device) that connects to the host computer 2 through a network 4 and records images on a recording medium as controlled by the host computer 2. More specifically, label paper having precut adhesive labels of a specific size affixed on a continuous backer is loaded into the printer 3. The printer 3 records an image based on a template (e.g. defined print layout, defined image layout, print template) onto a label affixed to the backer.

The network 4 is a wired LAN or wireless LAN network conforming to a specific standard such as Ethernet (R). The network 4 may include devices conforming to a USB or RS-232C protocol.

According to this embodiment of the invention, printer 3 replaces a previous printer 6. That is, before the printer 3 was connected to the host computer 2, a different printer 6 (also referred to below as the first or original printer) was connected and the host computer 2 controlled the original printer 6 to record images on the labels based on a template. Preferably, the original printer 6 in this embodiment was a monochrome printer, and the printer 3 according to this embodiment of the invention (also referred to below as a replacement printer 3) is a color printer.

One object of the invention is to provide a recording control system 1 that (1) enables recording images on labels using the replacement printer 3, and smoothly changing from the original printer 6 to the replacement printer 3, without changing the control commands that are output by the host computer 2 before and after replacing the original printer 6 with the replacement printer 3, that is, without changing the software installed on the host computer 2. Other objects of the invention are to provide a recording control system 1 that enables (2) desirably colorizing the printout using the ability of the replacement printer 3 to print in color, and (3) uses the ability to print in color to add value to the printed labels and improve user convenience.

As shown in FIG. 1, a template terminal 5 described below can also connect to the network 4.

The recording control system 1 is a system that can be deployed in supermarkets, convenience stores, department stores, and other retail businesses. The recording control system 1 in this embodiment has a function for using the second printer 3 to produce labels that are affixed to specific positions corresponding to specific products on display shelves where products are displayed in the store.

As shown in FIG. 1, a server 7 is connected to the network 4. The server 7 in this example is a POS (i.e. point-of-sale) server used to centrally manage the recording control system 1 deployed in a store, and includes a server-side controller 71 that centrally controls the server 7, and a re-writable, non-volatile, server-side storage unit 72 that stores data. An inventory management database **72*a* is stored together with a master product database and a master customer database in the server-side storage unit 72. The inventory management database 72*a*** is a database for managing the inventory of each product sold in the store (e.g. commercial product), and relationally stores at least a product code assigned uniquely to each product (e.g. product data), and the current inventory count of each corresponding product (e.g. product data).

The host computer 2 includes a host-side control unit 18 (recording control unit), a host-side storage unit 19, a host-side display unit 40, and a host-side input unit 41.

The host-side control unit 18 includes a CPU, RAM, ROM, and peripheral circuits, and centrally controls parts of the host computer 2.

The host-side storage unit 19 includes nonvolatile memory that stores data, and stores at least an application program 21, a device driver 23, and an inventory count threshold table 24. The inventory count threshold table 24 is described further below.

To record an image on a label with the printer 3, the application program 21 generates and outputs information related to the image to be recorded on the label ("label image information" below) to the device driver 23.

The device driver 23 is a program for controlling the original printer 6, and is written according to the hardware and software specifications of the original printer 6. When label image information is input from the application program 21, the device driver 23 generates and outputs to the printer 3 control commands written in the command language used to control the original printer 6. Using the method described below, the printer 3 records an image on a label according to the template based on the control commands written in the command set of the original printer 6.

The host-side display unit 40 has an LCD or other type of display panel, and displays information on the display panel as controlled by the host-side control unit 18.

The host-side input unit 41 includes input means such as operating switches, a mouse, or keyboard, detects operation of the input means, and outputs to the host-side control unit 18.

The printer 3 has a recording unit 39 including an inkjet head **39*a* (recording head) capable of color printing, a conveyance mechanism 39*b* that conveys the loaded label paper, and a cutting mechanism 39*c* that cuts the label paper at a specific position, and can record an image on a label of the label paper, cut the paper, and produce individual labels as the printout based on a template by means of the recording unit 39**.

As shown in FIG. 1, the printer 3 has a printer-side control unit 30 including a CPU, RAM, and ROM, and centrally controls parts of the printer 3. The printer-side control unit 30 includes a recording execution unit 32 that, when a control command in the command set of the original printer 6 is received from the host computer 2, interprets the control command and records the image with the recording unit 39. The function of the recording execution unit 32 is achieved by the cooperation of hardware and software, such as the CPU of the printer-side control unit 30 reading and running a firmware program.

The printer 3 also has a nonvolatile printer-side storage unit 33 (storage unit) that stores a program and data. A template database 35 as further described below is stored in the storage area of the printer-side storage unit 33.

The template terminal 5 includes a terminal-side control unit 51, terminal-side display unit 52, terminal-side input unit 53, and terminal-side storage unit 54.

The terminal-side control unit 51 includes a CPU, ROM, RAM, and centrally controls the template terminal 5.

The terminal-side display unit 52 has an LCD panel or other display panel, and displays information on the display panel as controlled by the terminal-side control unit 51.

The terminal-side input unit 53 is an input device such as an operating switch, mouse or keyboard, detects operation of the input device, and outputs to the terminal-side control unit 51.

The terminal-side storage unit 54 includes a hard disk drive or other nonvolatile memory device, and stores data in a nonvolatile manner. A dedicated tool 55, which is preferably a software tool, is installed in the template terminal 5. The terminal-side control unit 51 executes the processes described below using a function of the dedicated tool 55.

Recording Images on a Label

Figure 2:
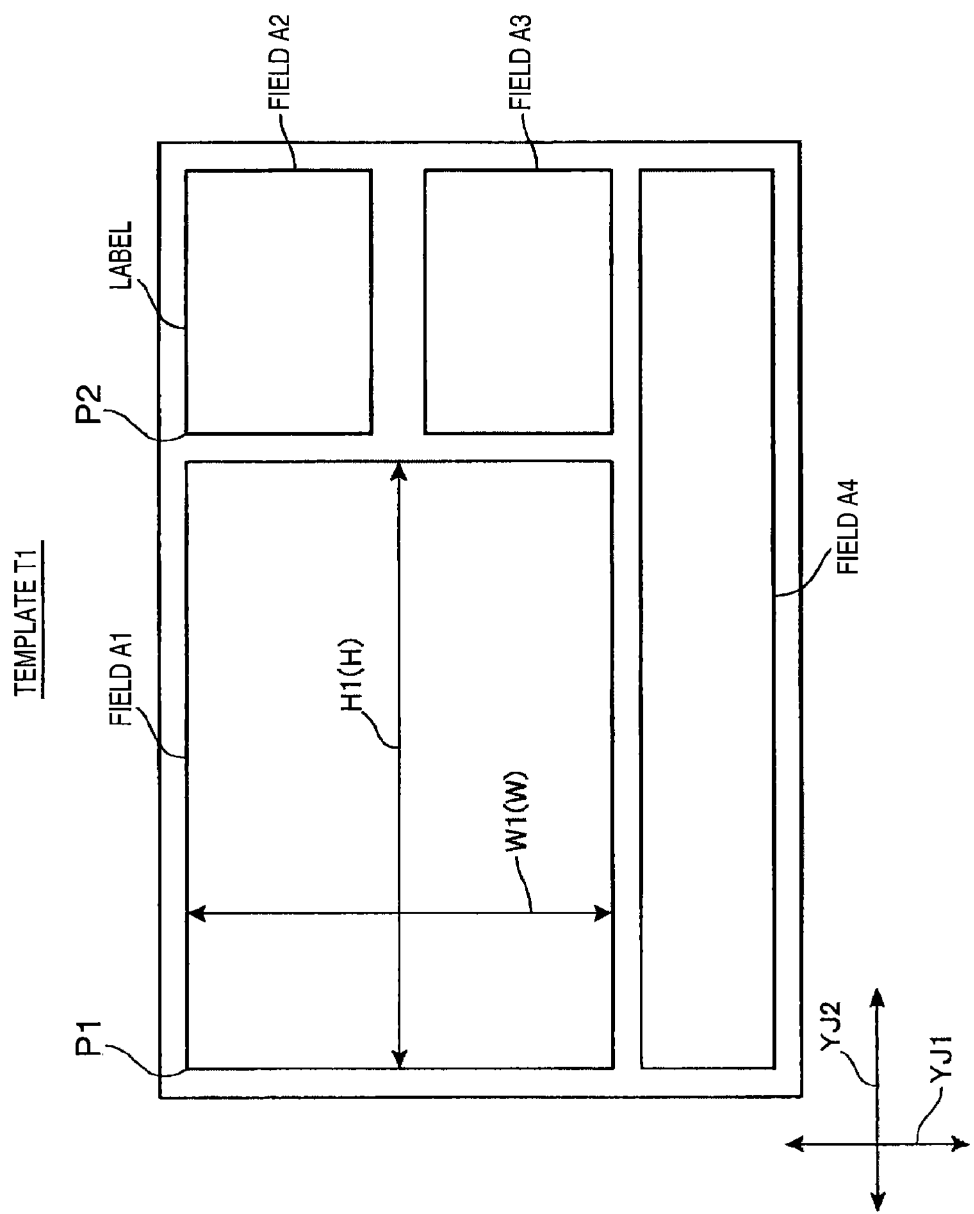
FIG. 2 shows an example of a template.
Figure 3:
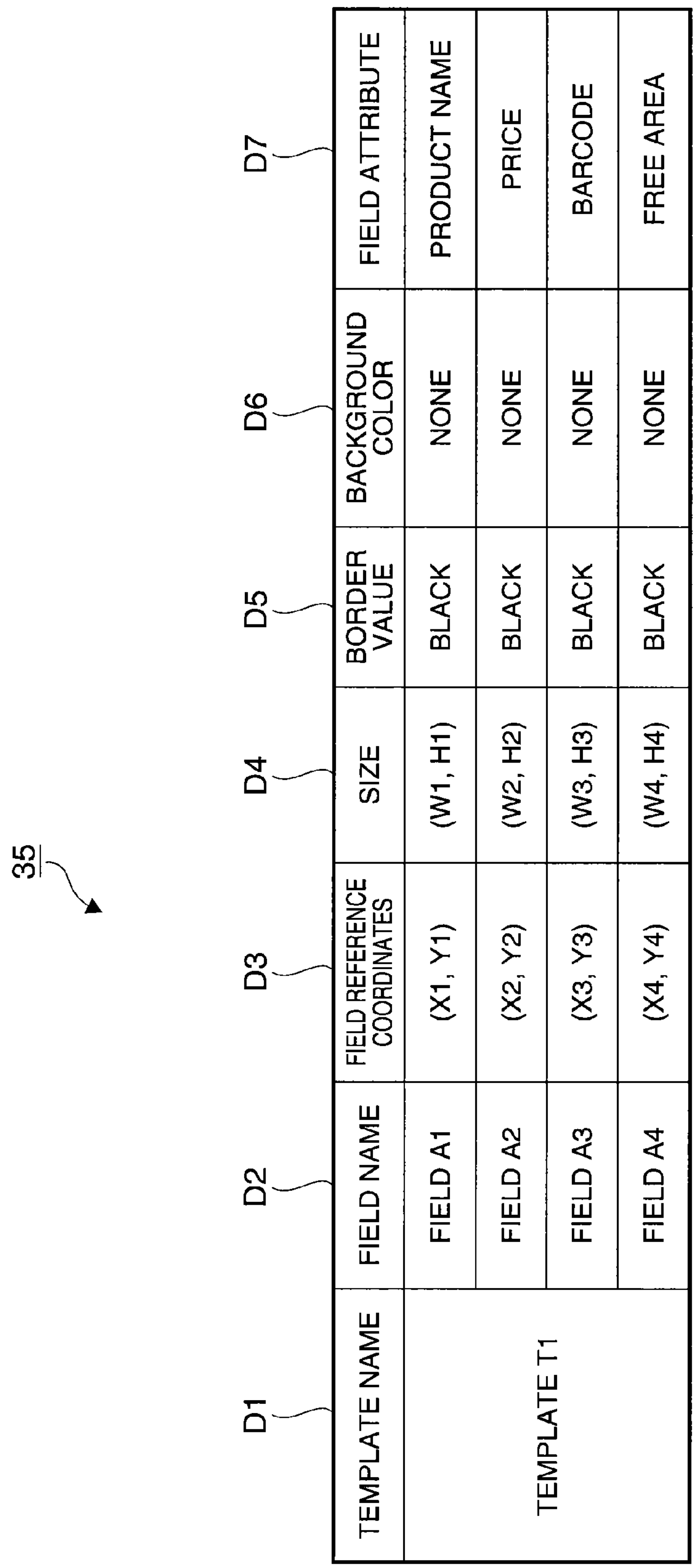
FIG. 3 shows the content of a template database.

Recording an image on a label using the recording control system described above is described below with reference to FIG. 2 and FIG. 3. FIG. 2 shows an example of a template, and FIG. 3 shows the content of a template database.

The printer 3 according to this embodiment of the invention records an image on a label according to a template as controlled by the host computer 2.

A template is a set of rules for recording an image in the recording area of the label, and in this embodiment includes the layout (pattern) of fields (areas) that can be printed in the recording area of the label. The recording area of a label is the maximum size of the space in which images can be recorded (dots can be placed) on one label. The recording area is segmented into fields (areas) according to the content of the image (information) to be recorded. Plural templates with different layouts of fields in the recording area are prepared in advance in this embodiment, and the printer 3 can record images on labels based on any one of the templates.

FIG. 2 shows an example of a template, and more specifically shows template T1, which is one of a plurality of preconfigured templates. As shown in FIG. 2, the template T1 has four rectangular fields, fields A1 to A4, that are formed in a specific pattern in the recording area of the label.

This template T1 is a template for producing shelf labels that are affixed to a specific position corresponding to a particular product on the display shelves on which products are displayed in a supermarket, convenience store, department store, or other retail business. Store customers can know the price, name, and other information about the corresponding product by reading the shelf label.

The information related to each field in a template, and information defining each field, is defined for each template in a template database 35.

FIG. 3 shows the content of the template database, and more specifically schematically shows the data structure of an exemplary template database 35. FIG. 3 shows the record for the template T1 shown in FIG. 2. These records define the default settings for a respective template. The template database in the example in FIG. 3 is a relational database, but the data structure of the template database 35 is not so limited.

The template name D1 field contains the name (identifier) uniquely assigned to the template.

The field name D2 fields contain the names (identification information) of the fields included in the template. As shown in FIG. 2, template T1 has four fields A1 to A4. As shown in FIG. 3, the template database 35 therefore contains four field records, one for each of the four fields A1 to A4, related to template T1, and each record stores an appropriate name in the field name D2 field.

The field reference coordinates D3 field contains the coordinates of a reference point for the field in a coordinate system of which the origin is a specific position in the recording area of the label. Any desired position in the recording area of the label can be specified using coordinates in this coordinate system. In this embodiment, the shape of each field in the recording area is a rectangle having two sides parallel to axis YJ1 of the label, and two sides parallel to axis YJ2, as shown in FIG. 2. The origin of a field denotes a specific one of the four vertices of the field border. As indicated by vertex P1 of field A1 in FIG. 2 and vertex P2 of field A2 in FIG. 2, the vertex at the top left of the four corners of each border is the origin in this embodiment.

The size D4 field contains information indicating the length W (i.e. width) of the field along axis YJ1, and the length H (i.e. height) of the field along axis YJ2. For example, information denoting length W1 and length H1 is stored as the size D4 of field A1 in FIG. 2. Because the fields are rectangular as described above, the position, shape, and size of each field in the recording area can be specifically determined using the field reference coordinates D3 and the size D4 fields.

The border information D5 field contains information describing the color of the border around the area. The printer 3 in this embodiment is a color printer, a border color can be specified for each field, and the border will be recorded on the label in the specified color. Note that the color of the border or the background described below can also be set to "none," that is, the border is not recorded or color is not added to the background described below.

The background information D6 field contains information identifying the color of the background in the field. For example, if information indicating blue is stored in the background information D6, the entire corresponding field will be printed blue.

The field attribute D7 field contains information about the attributes of specific template field. A field attribute is information expressing a feature, characteristic, or content, for example, of the image (information) recorded in the corresponding field.

As described above, template T1 is a template for labels (having various product data) that are affixed to the shelves on which products are displayed in a store, field A1 in template T1 is the field where the product name is recorded, and the attribute for field A1 is "product name." Field A2 is the field where the product price is recorded, and the attribute of this field is "price." Field A3 is the field for recording a barcode used by store employees, and the attribute is "barcode." Field A4 is a free field for recording image content that is not fixed, such as a message about the product or valuable information related to the product, and the attribute is "free area."

The terminal-side control unit 51 of the template terminal 5 has a function for generating the records in the template database 35 based on information stored in a template by the original printer 6. A corresponding record is therefore created in the template database 35 for each template that can be used by the original printer 6, and the new printer 3 can record images based on the templates used by the original printer 6.

More specifically, data in a specific format (the "original template data" below) including at least the template name, the name of each field in the template, and location and size information for each field is stored for each template that can be used by the original printer 6. For example, the original template data for the template on which template T1 is based includes at least template T1 as the template name, fields A1 to A4 as the field names, and information denoting the position and size of each of the fields A1 to A4.

The terminal-side control unit 51 of the template terminal 5 communicates over the network 4 with the original printer 6 and requests transmission of the original template data. In response to this request, the original printer 6 sends the original template data to the template terminal 5.

The terminal-side control unit 51 communicates with the printer 3 over the network 4, and generates records for a template in the template database 35 based on the original template data received from the original printer 6.

The terminal-side control unit 51 stores the name of the template in the original template data in the template name D1 field of the template database 35, and stores the names of the template fields contained in the original template data in the field name D2 fields, for each generated record. The template name stored in the template name D1 field and the field names stored in the field name D2 fields of the template record created in the template database 35 stored by the printer 3 for a template that was used by the original printer 6 are therefore the same as the template name and field names of the original template.

For each field in the template, the terminal-side control unit 51 calculates the field reference coordinates D3 and size D4 based on the field position and size information contained in the original template data, and stores the calculated values in the field reference coordinates D3 and size D4 fields of the generated database record.

Note that the dedicated tool 55 also contains a program with an algorithm for outputting the field reference coordinates D3 and size D4 information based on the input field position and size information contained in the original template data, and calculates the field reference coordinates D3 and size D4 information for each field using this program function.

After storing appropriate information in the corresponding template name D1, field name D2, field reference coordinates D3, and size D4 fields of the record generated for each field contained in a template, the terminal-side control unit 51 stores corresponding default values in the border information D5, background information D6, and field attribute D7 fields. The default values to be stored can be predefined by the user.

The terminal-side control unit 51 of the template terminal 5 can also update specific information in specific records of the template database as instructed by the user. More specifically, the dedicated tool 55 also has a function for communicating with the printer-side control unit 30 of the printer 3, accessing the template database stored in the printer-side storage unit 33, and acquiring content therefrom, and a function for displaying the content from the template database 35 on the display panel together with a user interface enabling the user to update specific information in a specific record. The user can refer to the user interface on the display panel and operate an input device of the terminal-side input unit 53 to update specific information.

The user can therefore set the default color of the border around a specific area to red, or the background of a specific area to blue, for example, and thereby use the ability of the printer 3 to print color to desirably colorize the printout. The user interface also has fields for selectively inputting template field attributes, and the user can selectively update the field attribute D7 fields of the template database 35. As many selectable field attributes as needed are provided.

In this embodiment, the field name D2, field reference coordinates D3, size D4, border information D5, background information D6, and field attribute D7 in the template database 35 are referred to "area definition data" herein.

Basic Operation of the Host Computer and Printer

The basic operation of the host computer 2 and printer 3 when recording an image on a label based on a template is described next.

As described above, to record an image on a label, the application program 21 of the host computer 2 first generates and outputs label image information to the device driver 23. Based on the label image information, the device driver 23 then generates and outputs a control command instructing recording an image on a label to the printer 3.

This control command is a command in the command set of the original printer 6, and includes information specifying the name of the template to use, and related information for each field in the specified template specifying the name of the field and the image to be recorded in the field identified by the field name. When the image to be recorded in a template field is a text string, information expressing the string as a combination of specific character codes is included in the information related to the image to be recorded in the template field.

When the control command is input, the recording execution unit 32 of the printer 3 analyzes the control command and extracts the name of the specified template. As described above, the template names managed by the original printer 6 exactly match the names stored in the template name D1 field of the template database managed by the printer 3. The recording execution unit 32 references the template database 35, and extracts the record storing the name of the extracted template in the template name D1 field. The extracted record is the record of the template to be used to record an image on the label. Based on the extracted record, the recording execution unit 32 then records images in each field of the template while managing the position, shape, default image to be recorded, position, border color, and background color based on the field reference coordinates D3, size D4, border information D5, and background information D6 fields of each template field.

While recording, the recording execution unit 32 analyzes the commands in the command set of the original printer 6 to manage the image and the position of the image to be recorded in each template field, and record the appropriate image specified by the control command in the appropriate position of each template field. Note that the firmware includes a function for analyzing control commands in the command set of the original printer 6.

Example of Recording a Label

Figure 4A:
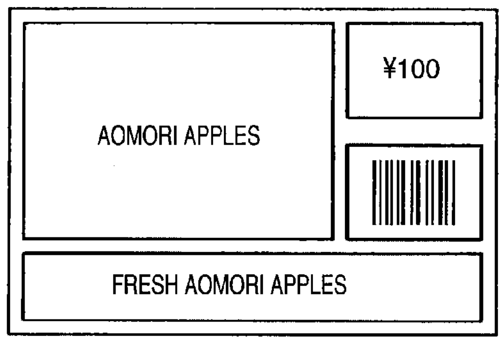
FIGS. 4A, 4B and 4C show examples of an image recorded based on a template.
Figure 4B:
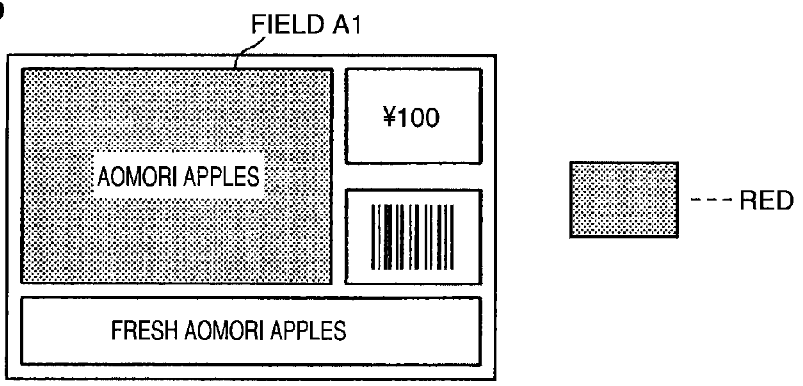
Figure 4C:
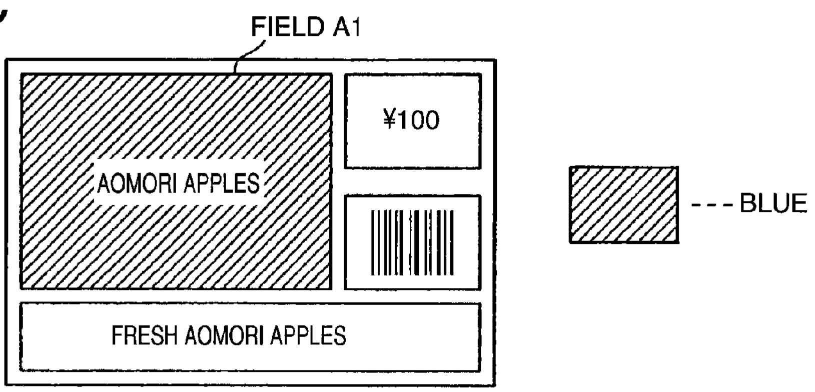

An example of recording a label is described below with reference to FIG. 4A to FIG. 4C. FIG. 4A to FIG. 4C show an example of a label on which images are recorded according to template T1. FIG. 4A schematically shows an example of a label to which images are recorded based on template T1.

In the example in FIG. 4A, "Aomori apples" is recorded as the product name in field A1. The price of the product, 100 yen, is recorded in field A2. A barcode containing the product code is recorded in field A3. This barcode can be read by a store employee using a barcode reader as needed. A phrase advertising the product is recorded as a string in field A4.

The template terminal 5 in this embodiment of the invention thus acquires necessary information related to a template from the original printer 6, and based on the acquired information generates records in the template database 35. The template identification information (template name) and identification information (field names) for each field in the template managed by the original printer 6 are thus the same as the information managed by the printer 3. As a result, the printer 3 can appropriately manage the template to use and the template fields, and record images to a label based on the template, using the control commands that are output to the original printer 6.

The printer 3 can also desirably colorize the field borders and field background, and record images using a template based on a template that was used by the original printer 6, without changing the control commands output from the host computer 2 to the original printer 6, that is, without modifying the application program 21 or device driver 23.

Operation of Devices in the Recording Control System

Figure 5:
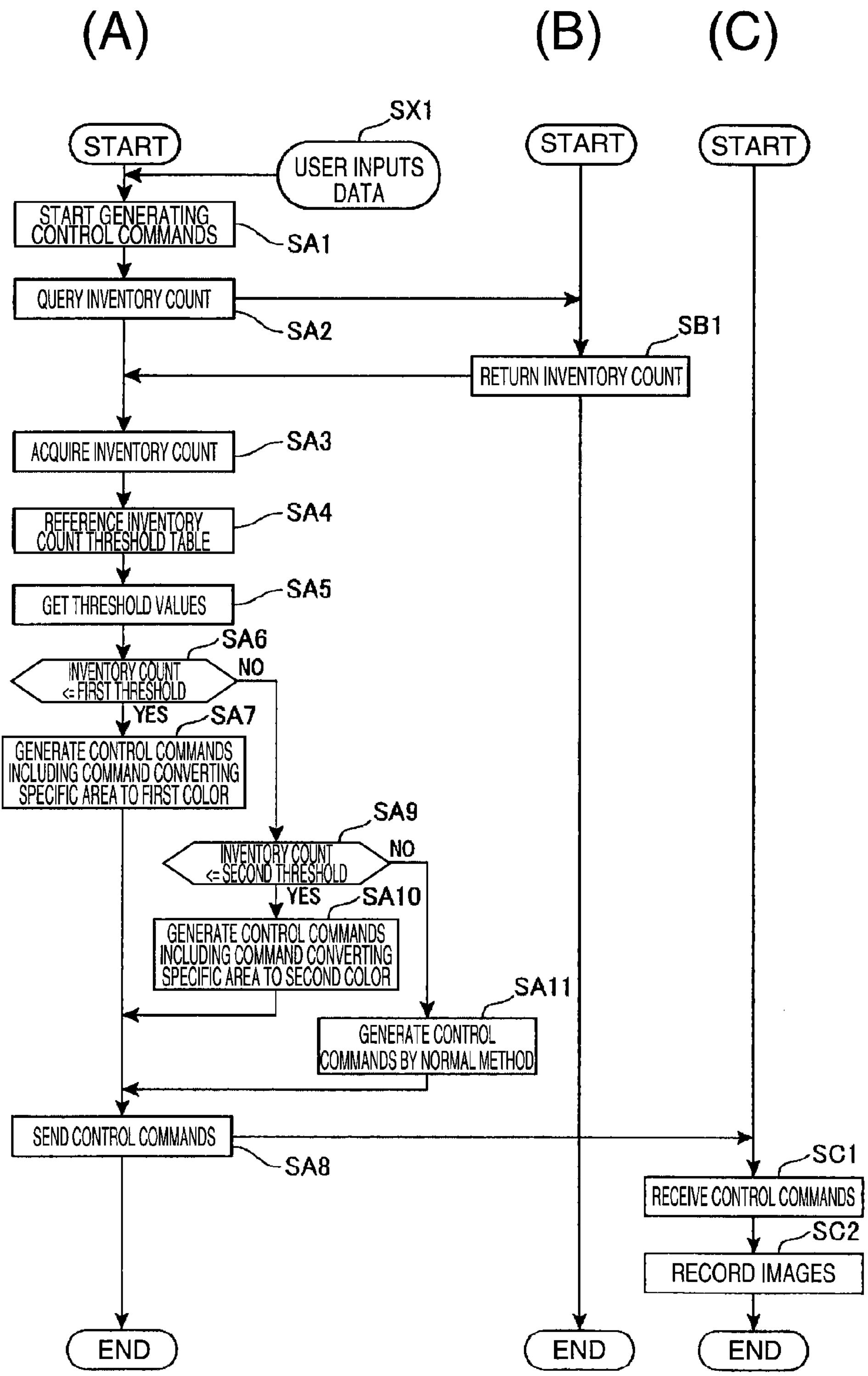
FIG. 5 is a flow chart showing the operation of devices in a recording control system according to the first embodiment of the invention.

When producing a label for a particular product, the recording control system 1 according to this embodiment of the invention changes the images recorded on the label from their default settings according to the current inventory of the product, and thereby adds value to the printed label (the printout). The operation of the devices in this recording control system 1 when producing a label is described below with reference to FIG. 5 and FIG. 6. FIG. 5 is a flow chart showing the operation of devices in the recording control system 1 according to the first embodiment of the invention, column (A) showing the operation of the host computer 2, (B) showing the operation of the server 7, and (C) the operation of the printer 3. In the following example, the host-side control unit 18 functions as the recording control unit. FIG. 6 shows an example of the content of the inventory count threshold table.

To produce a label for any single product, the user inputs the name of the template to use, the product code of the product for which a label is to be produced, and information about the images to be recorded on each label created by the template (step SX1). The application program 21 has a function that provides a user interface enabling the user to input this information, and the user can easily and appropriately input the information through the user interface.

The user interface, for example, enables the user to select a template name while viewing a preview of each template, and enables the user to selectively input a product code. The information about the images to be recorded on each label created by the template includes, in the examples shown in FIGS. 4A, 4B and 4C, "Aomori apples" infield A1, "¥100" in field A2, and a phrase promoting the product in field A4. The user interface also enables the user to easily enter the text to be recorded in each area, add styling to the text, and control the position where the string is to be recorded while viewing the text in a preview of the template. If an instruction for recording a barcode in field A3 related to the product indicated by the product code is input, the application program 21 automatically accesses the server 7, for example, to acquire the barcode or other necessary information.

The timing when the user inputs this information is not particularly limited, and information entered by the user could be stored and reused at a later date.

Once data input by the user is completed in step SX1, the host-side control unit 18 of the host computer 2 starts generating control commands for recording images on the label (step SA1).

First, the host-side control unit 18 functioning as the recording control unit communicates with the server 7, and queries the inventory count of the product denoted by the product code input in step SX1 (step SA2). The protocol used for queries is predefined.

In response to the query received in step SA2, the server-side controller 71 of the server 7 searches the inventory management database 72*a* in the server-side storage unit 72 using the product code as the search key, retrieves the inventory count of the product identified by the product code, and returns the inventory count (step SB1).

When the inventory count of the product related to the label to be produced is received in the response from the server 7 (step SA3), the host-side control unit 18 of the host computer 2 references the inventory count threshold table 24 (step SA4).

As shown in FIG. 6, the inventory count threshold table 24 is a lookup table that stores a product code, first threshold value Ta1, and second threshold value Ta2 for each product. The first threshold value Ta1 and second threshold value Ta2 are reference values that are compared with the current inventory count as described in detail below.

The host-side control unit 18 references this inventory count threshold table 24 and retrieves the first threshold value Ta1 and second threshold value Ta2 of the product using the product code of the product for which a label is to be produced as the search key (step SA5).

Next, the host-side control unit 18 determines if the inventory count acquired in step SA3 is less than or equal to first threshold value Ta1 (step SA6).

If the inventory count is less than or equal to first threshold value Ta1 (step SA6 returns YES), the host-side control unit 18 generates control commands including a control command for converting the background color of a specific area from its default color to a different specific color (referred to below for convenience as the first color) (step SA7), and sends the commands to the printer 3 (step SA8). Altering the default color to the alternate, first color temporarily alters the current template (i.e. defines a temporary, altered template) that is used for the current printing operation. The original, default colors of the stored template are preferably not permanently changed.

The specific area for which the background color is converted from its initial default color to the first color, and the specific color used as the first color, are predefined in the template, and are defined by the device driver 23 or other program. When the default colors of an originally selected template are changed to the alternate first color, the template may optionally be referred to as an altered template. In this embodiment, when the inventory count is less than or equal to first threshold value Ta1 when using template T1, the host-side control unit 18 generates control commands including a command converting the background of field A1 to red. When the printer 3 records images to the label based on the received control commands, the background color of field A1 becomes red. More specifically, when using template T1 and the inventory count of the selected product is less than or equal to the first threshold value Ta1, the background color of field A1 in the label related to that product becomes red in this embodiment.

In this example, first threshold value Ta1 is set so that the inventory count goes below first threshold value Ta1 when the remaining inventory of the selected product is extremely low and the product should be restocked. Therefore, when the remaining inventory of the selected product is extremely low and the product should be restocked, the background color of a specific area on the label for that product is converted to the first color.

This has the following effect.

Specifically, by seeing the specific color in the specific area of the label, a store worker can easily and accurately know that the inventory of the labeled product is extremely low and inventory needs replenishing. In addition, by making customers shopping in the store aware of the relationship between the color of the label and the inventory status, such as that the inventory is low, when the background of the area where the product name is recorded is red, customers can easily and accurately know that the inventory of the labeled product is low, and can take appropriate action, such as buying the product soon, if the customer is thinking of buying the product. Furthermore, low inventory can suggest that the product is popular, and can thereby create in the customer a desire to purchase the product.

This embodiment of the invention can thus add value to the printout by achieving the above effect.

Note that the host-side control unit 18 functioning as the recording control unit knows the inventory level of the product by comparing the current product inventory with the first threshold value Ta1 in step SA6.

If the inventory exceeds first threshold value Ta1 in step SA6, the host-side control unit 18 determines if the inventory count is less than or equal to second threshold value Ta2 (step SA9). If the current inventory is less than or equal to second threshold value Ta2 (step SA0 returns YES), the host-side control unit 18 generates control commands including a command to convert the background color of a specific area included in the areas contained in the used template to a specific color other than the first color (for convenience, “second color” below) (step SA10), and sends the commands to the printer 3 (step SA8).

The specific area for which the background color is converted to the second color, and the specific color used as the second color, are predefined in the template, and are defined by the device driver 23 or other program. In this embodiment, when the inventory count is greater than first threshold value Ta1 and less than or equal to second threshold value Ta2 when using template T1, the host-side control unit 18 generates control commands including a command converting the background of field A1 to blue. When the printer 3 records images to the label based on the received control commands, the background color of field A1 becomes blue. More specifically, when using template T1 and the inventory count of the selected product is greater than first threshold value Ta1 and less than or equal to second threshold value Ta2, the background color of field A1 in the label related to that product becomes blue in this embodiment.

In this example, second threshold value Ta2 is set so that the inventory count goes below the second threshold value Ta2 when the remaining inventory of the selected product is low and restocking the product should be considered. Therefore, when the remaining inventory of the selected product is low and restocking the product should be considered, the background color of a specific area on the label for that product is converted to the second color.

This has an effect similar to the effect of changing the background color of a specific area to the first color as described above. More specifically, by seeing a specific color in a specific area of the label, store employees can easily and accurately know the inventory status, and customers can take appropriate action regarding product purchases. A desire to purchase the product can also be created.

Note that the host-side control unit 18 functioning as the recording control unit also knows the inventory level of the product by comparing the current product inventory with the second threshold value Ta2 in step SA9.

In step SA9, if the inventory count exceeds the second threshold value Ta2 (step SA9 returns NO), the host-side control unit 18 generates control commands using the normal method (i.e. using default settings) (step SA11), and sends the commands to the printer 3 (step SA8).

In step SA8, when the host computer 2 sends the control commands to the printer 3, the recording execution unit 32 of the printer 3 receives the control commands (step SC1), and based on the control commands controls parts and devices of the recording unit 39 to record the images on a label (step SC2).

FIG. 4B shows an example of the images recorded on a label in step SC2 when using template T1 and the inventory count of the product related to the label is less than or equal to the first threshold value Ta1. In this event, the background color of field A1 in template T1 is printed red as shown in the figure because a command that converts the color of the background of field A1 to red is contained in the control commands. The effect of this is as described above.

FIG. 4C shows an example of the images recorded on the label in step SC2 when the inventory count of the product related to the label is less than or equal to second threshold value Ta2 and template T1 is used. In this event, the background color of field A1 in template T1 is printed blue as shown in the figure because a command that converts the color of the background of field A1 to blue is contained in the control commands. The effect of this is as described above.

This first example simply describes one embodiment of the invention, and can be modified and adapted as desired without departing from the scope of the invention.

More specifically, this first embodiment changes the color of the background of a specific area of the template that is used to a specific color when the inventory level of the product satisfies a specific condition. However, the invention is not so limited, and the color of the border around a specific area could be changed, or the color of the background and the color of the border of a specific area could be changed to respective colors, instead. In these cases, effects similar to changing the color of the background to a specific color can also be achieved.

Furthermore, the server 7 manages the product inventory in the first embodiment, but a configuration in which the host computer 2 manages the inventory of each product and the inventory data is stored in the host-side storage unit 19 is also conceivable. In this configuration, the host-side control unit 18 of the host computer 2 acquires the inventory count, the first threshold value Ta1, and the second threshold value Ta2 of the product (determines the current inventory level the product) based on the data related to managing product inventory stored in the host-side storage unit 19.

As described above, the printer 3 in the recording control system 1 according to this embodiment of the invention has an inkjet head 39*a*, which is a recording head capable of color printing, and a printer-side storage unit 33 that stores area definition data defining the recording areas in each of a plurality of templates comprising one or a plurality of areas that are formed in the printable area of the recording medium (label). When control commands that specify a particular template and instruct recording images in the areas of the specified template are received from the host computer 2, the recording execution unit 32 of the printer 3 controls the inkjet head 39*a* based on the area definition data for each field in the specified template to record the images in each field according to the template.

In order to record images related to one product on labels according to a particular template with the printer 3, the host computer 2 has a host-side control unit 18 (recording control unit) that acquires information related to the inventory of the one product, and generates and outputs control commands including information for changing the color of a specific area (field) in the template to a specific color based on the current inventory level of that one product.

Thus comprised, the color of a specific area in the template is changed to and recorded using a specific color based on the current inventory of the product. As a result, by simply seeing the color of a specific area amongst the plural areas formed on a label, the user can easily and reliably know the current inventory level, and user convenience can be improved. More specifically, value can be added to the printout.

In order to record images related to one product on a recording medium according to a particular template with the printer 3, the host-side control unit 18 of the host computer 2 determines the current inventory of the one product (whether the inventory count is less than or equal to a first threshold value Ta1 or is less than or equal to a second threshold value Ta2), and generates and outputs control commands including information for changing the color of a specific area (field) in the template to a specific color based on the current inventory level of that one product.

As a result, by simply seeing the color of a specific area amongst the plural areas formed on a label, the user can easily and reliably know the whether the inventory of the product is high or low, and user convenience can be improved.

The host-side control unit 18 of the host computer 2 in this embodiment queries the server 7 that manages product inventory to determine whether the inventory of the product is high or low.

As a result, the host-side control unit 18 can appropriately determine the inventory level of the product.

As described above, a configuration in which data related to inventory management is stored in the host-side storage unit 19 of the host computer 2, and the inventory level of a particular product can be determined based on the stored data.

The host-side control unit 18 in this embodiment causes the printer 3 to execute a process that changes the background color of a specific area to a specific color according to the inventory count of the product.

With this embodiment, the color related to a particular area can be effectively changed to a specific color by using the ability to record according to a template composed of one or a plurality of areas (fields).

As described above, a configuration that instead causes the printer 3 to process changing the color of the border of a specific area to a specific color is also conceivable.

Embodiment 2

A second embodiment of the invention is described next.

When producing a label for one product and the relationship between the inventory count, first threshold value Ta1, and second threshold value Ta2 of the one product satisfy a specific condition in the first embodiment, the host-side control unit 18 of the host computer 2 changes the color of the background or the color of the border of a specific area (field) included in the areas (fields) of the selected template to a specific color. In other words, the first embodiment changes the color of a particular area (field) to a specific color according to the inventory level of the product.

When producing a label for one product in the second embodiment of the invention, the host-side control unit 18 of the host computer 2 determines the rate of decrease in the inventory of the one product, and changes the color of the background of a specific area (field) included in the areas (fields) of the selected template to a specific color according to the rate of decrease in the inventory of the product.

More specifically, in this embodiment the server 7 manages for each product both the actual inventory count and the rate of decrease in product inventory. The rate of decrease in product inventory is information about the pace at which the inventory of a product drops, and could be information indicating that the inventory count drops on average by 5 items per day, for example. The server 7 manages the rate of decrease in product inventory using a statistical method such as acquiring the inventory count of each product at a regular period.

When producing a label for one product, the host-side control unit 18 of the host computer 2 queries the server 7 to acquire the rate of decrease in product inventory for that one product. Next, if the rate of decrease in product inventory is greater than a specific threshold set for each product, for example, the host-side control unit 18 changes the color of the border of a specific area in the selected template to a specific color, or changes the color of the background of a specific area in the selected template to a specific, and then causes the printer 3 to record images to the label.

This has the following effect.

Specifically, by seeing the specific color in the specific area of the label, a store worker can easily and accurately know the rate of decrease in the inventory of the labeled product. In addition, by making customers shopping in the store aware of the relationship between the color of the label and the rate of decrease in the inventory, such as that the inventory is decreasing rapidly, when the background of the area where the product name is recorded is red, customers can easily and accurately know that the rate of decrease in the inventory of the labeled product is high, and can take appropriate action, such as buying the product soon, if the customer is thinking of buying the product. Furthermore, a high rate of decrease in product inventory can suggest that the product is popular, and can thereby create in the customer a desire to purchase the product.

This embodiment of the invention can thus add value achieving the above effect to the printout.

As in the first embodiment, plural threshold values that are compared with the rate of decrease in product inventory could be set, and different colors can be given to the template fields based on the relationship to the threshold values. This enables reporting the rate of decrease in product inventory in greater detail.

In the above example, the server 7 has a function for managing product inventory and calculating the rate of decrease in product inventory, and the host-side control unit 18 of the host computer 2 queries the server 7 to acquire the rate of decrease in product inventory, but the following configuration is also conceivable. More specifically, a configuration in which data related to managing product inventory is stored in the host-side storage unit 19 of the host computer 2, and the host-side control unit 18 calculates the rate of decrease in the inventory of one product based on the stored data related to managing inventory, is also conceivable. Further alternatively, the host-side control unit 18 could conceivably query the server 7 that manages product inventory, acquire information related to the inventory of one product, and based on the acquired information calculate the rate of decrease in the inventory of the one product. In either embodiment, the host-side control unit 18 can appropriately acquire the rate of decrease in the inventory of a product.

Embodiment 3

A third embodiment of the invention is described next.

In the first and second embodiments described above, the host computer 2 acquires information related to product inventory, and more specifically the inventory count of a product (whether product inventory is high or low), or the rate of decrease in product inventory, and the host-side control unit 18 of the host computer 2 generates and sends to the printer 3 control commands including information converting a specific area in a particular template from one color to a specific color for printing based on the inventory status of a particular product.

In this embodiment, the printer-side control unit 30 of the printer 3 acquires information related to the inventory of a product, and based on the inventory of that product, converts a color related to a specific area in one template to a specific color for recording. The method whereby the printer-side control unit 30 acquires the product inventory information is any method that can be used in the first or second embodiment described above. More specifically, the printer-side control unit 30 could query the server 7 or the host computer 2, or data related to product inventory could be stored in the printer 3, and the printer-side control unit 30 could acquire the product inventory information based on this local data. In this embodiment, the printer-side control unit 30 functions as the recording control unit.

This example simply describes one embodiment of the invention, and can be modified and adapted as desired without departing from the scope of the invention.

For example, any number of threshold values could be set for comparison with the inventory count of the product in the first embodiment, or the rate of decrease in product inventory in the second embodiment.

Furthermore, the function blocks shown in FIG. 1 can be achieved by the cooperation of hardware and software, and do not suggest a particular hardware configuration. The functions of the function blocks of the host computer 2 and printer 3 can also be rendered by a separate device externally connected to the host computer 2 or printer 3. The host computer 2 and printer 3 could also execute the operations described above by running a program stored on an externally connected storage medium.

Embodiment 4

Recording Control System Configuration

Figure 7:
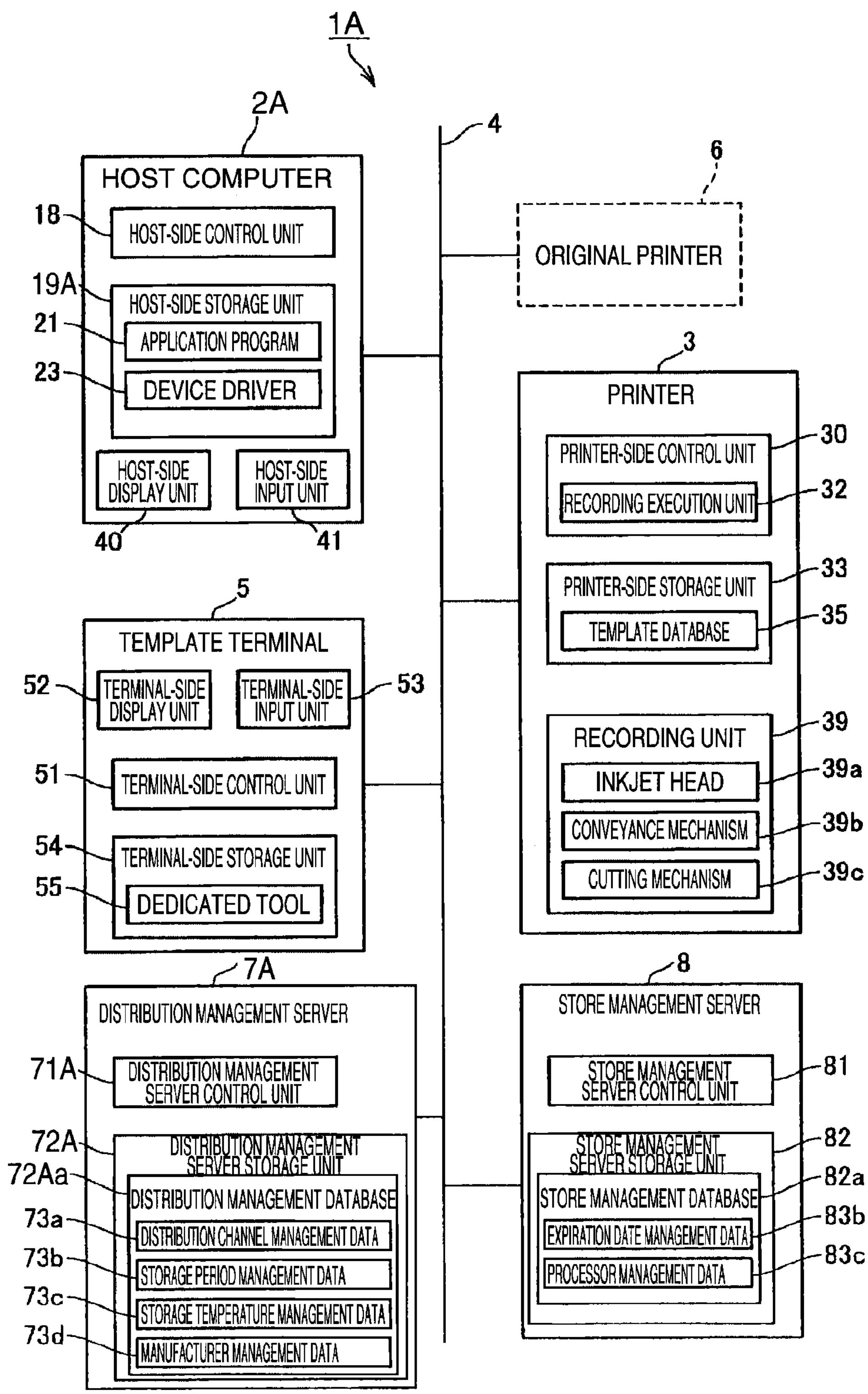
FIG. 7 is a function block diagram showing the configuration of a recording control system according to a fourth embodiment of the invention.

The configuration of a recording control system according to the fourth embodiment of the invention is described next with reference to FIG. 7. FIG. 7 is a function block diagram showing the configuration of a recording control system 1A according to this embodiment of the invention. The recording control system 1A according to the fourth embodiment of the invention applies to distribution information related to distribution of a product. Note that aspects of the configuration and content that are the same as in the first to third embodiments described above are identified by the same reference numerals, and further description thereof is omitted below.

As shown in FIG. 7, like the recording control system 1 according to the first embodiment, the recording control system 1A according to this embodiment of the invention includes a host computer 2A (e.g. control device, host device, or host computing device) and a printer 3 (recording device) that connects to the host computer 2A through a network 4 and records images on a recording medium as controlled by the host computer 2A. More specifically, label paper having precut adhesive labels of a specific size affixed on a continuous backer is loaded into the printer 3, and the printer 3 records an image based on a template to a label affixed to the backer.

The network 4 is a wired LAN or wireless LAN network conforming to a specific standard such as Ethernet (R). The network 4 may include devices conforming to a USB or RS-232C protocol.

According to this embodiment of the invention, printer 3 replaces a previous printer 6. That is, before the printer 3 according to this embodiment of the invention is connected to the host computer 2A, a different printer 6 (also referred to below as the first or original printer) was connected and the host computer 2A controlled the original printer 6 to record images on the labels based on a template. The original printer 6 in this embodiment is a monochrome printer, and the printer 3 according to this embodiment of the invention (also referred to below as a replacement printer 3) is a color printer.

One object of the invention is to provide a recording control system 1A that (1) enables recording images on labels using the replacement printer 3, and smoothly changing from the original printer 6 to the replacement printer 3, without changing the control commands that are output by the host computer 2A before and after replacing the original printer 6 with the replacement printer 3, that is, without changing the software installed on the host computer 2A. Other objects of the invention are to provide a recording control system 1A that enables (2) desirably colorizing the printout using the ability of the replacement printer 3 to print in color, and (3) uses the ability to print in color to add value to the printed labels and improve user convenience.

Recording control system 1A functions include producing labels ("distribution labels" below) that are affixed to products or product packaging after the products are produced as the products pass through the distribution channel from the manufacturer to the supermarket, convenience store, department store, or other retail store where the products are sold, and producing labels ("POS labels" below) that are affixed to specific positions corresponding to specific products on display shelves where products are displayed in the store.

A product as used in this embodiment conceptually includes any product that may ultimately be sold in a store, including agricultural products, seafood and marine products, electronics and electrical appliances, books, and processed foods.

A distribution management server 7A, and a store management server 8, are connected to the network 4.

The distribution management server 7A is a server that manages information related to products while in the distribution channel between product manufacture and delivery to the store that sells the product. The store management server 8 is a so-called POS server, and stores master databases such as an inventory management database, a master product database, and a master customer database. The distribution management server 7A and store management server 8 are shown connected directly to the network 4 in this example, but the servers could be connected to the network 4 over the Internet, for example.

As shown in FIG. 7, the host computer 2A includes a host-side storage unit 19A, and a host-side control unit 18 (recording control unit), host-side display unit 40, and host-side input unit 41 as in the recording control system 1 according to the first embodiment above.

The host-side control unit 18 includes a CPU, RAM, ROM, and peripheral circuits, and centrally controls parts of the host computer 2A.

The host-side storage unit 19A includes nonvolatile memory that stores data, and stores at least an application program 21, and a device driver 23 as in the recording control system 1 according to the first embodiment.

The distribution management server 7A is a server that manages information related to products while in the distribution channel between product manufacture and delivery to the store that sells the product, and includes a distribution management server control unit 71A that centrally controls the server, and a distribution management server storage unit 72A that stores data. A distribution management database 72Aa is stored in the distribution management server storage unit 72A.

Distribution channel management data 73*a* is stored in the distribution management database 72Aa. The distribution channel management data 73*a* is data comprising information about each product in the distribution channel from the time product is manufactured until the product is delivered to the store, and includes information about where the product was manufactured, where it was stored, what distribution centers the product passed through, and by what shipping means the product was carried. This information is stored relationally with identification information uniquely assigned to the product, and is reported to the distribution management server 7A from a terminal in each facility and distribution means on the distribution channel according to the distribution status of the product. The distribution management server control unit 71A appropriately updates the distribution channel management data 73*a* based on the reported information.

The distribution management server 7A in this embodiment has a function for determining if a product was distributed through the normal route expected for that product, and if the product did not pass through the normal route, the distribution management server control unit 71A stores data reporting an improper route related to the identification information of that product in the distribution channel management data 73*a*.

Storage period management data 73*b* is also stored in the distribution management database 72Aa. This storage period management data 73*b* is data including information indicating how much time has passed since the product was first stored when a product is stored in a specific facility or location. This information is stored for each product relationally to the identification information. Information about the storage condition of the product is reported from a terminal in the storage facility to the distribution management server 7A, and the distribution management server control unit 71A updates the storage period management data 73*b* appropriately based on the reported information.

The distribution management server 7A in this embodiment also has a function that determines if a product has been stored past the storage limit if a maximum storage limit has been defined for the product. If the storage limit has past, the distribution management server control unit 71A stores data indicating the storage limit has past relationally to the identification information for the product in the storage period management data 73*b*.

Storage temperature management data 73*c* is also stored in the distribution management database 72Aa. This storage temperature management data 73*c* is data including information indicating the temperature of the product, and/or information indicating the temperature of the environment where the product is stored, while the product is in the distribution channel. This information is stored for each product relationally to the identification information. Information about the temperature of the product is reported to the distribution management server 7A from a terminal in each facility and distribution means on the distribution channel according to the distribution status of the product, and the distribution management server control unit 71A appropriately updates the storage temperature management data 73*c* based on the reported information.

The distribution management server 7A in this embodiment also has a function that determines if the temperature of a product has exceeded the temperature limit if a temperature limit has been set for the product. If the temperature limit is exceeded, the distribution management server control unit 71A stores data indicating the limit was exceeded relationally to the identification information for the product in the storage temperature management data 73*c*. Note that if a temperature range of 5° C. to 20° C. is set as the temperature range in which the product must be stored, for example, the temperature of the product exceeding the limit includes the temperature of the storage environment going below 5° C. or above 20° C.

Manufacturer management data 73*d* is also stored in the distribution management database 72Aa. This manufacturer management data 73*d* is data identifying the manufacturer of the product. This information is stored for each product relationally to the identification information. Information about the manufacturer is reported to the distribution management server 7A from a terminal in a specific facility on the distribution channel, and the distribution management server control unit 71A appropriately updates the manufacturer management data 73*d* based on the reported information.

The distribution management server 7A in this embodiment also has a function for determining if each product was manufactured by the expected authorized manufacturer, and if a product was not manufactured by the authorized manufacturer, the distribution management server control unit 71A stores information indicating an unauthorized manufacturer relationally to the identification information of the product in the manufacturer management data 73*d*.

The store management server 8 has a store management server control unit 81 that centrally controls the store management server 8, and a store management server storage unit 82 that stores data. A store management database 82*a* is stored in the store management server storage unit 82.

Expiration date management data 83*b* is stored in the store management database 82*a*. This data is data storing expiration date information for products sold in the store relationally to the identification information of each product. The store management server control unit 81 receives information indicating the expiration date of each product from appropriate terminals, updates the content of the expiration date management data 83*b* accordingly, and stores data indicating that the expiration date is approaching for products nearing the expiration date relationally to the identification information of the product in the expiration date management data 83*b*.

Processor management data 83*c* is also stored in the store management database 82*a*. When a product sold in the store is processed in some way, this data stores the name of the processor relationally to the identification information of the processed product. The processor includes the company that cleaned and filleted the fish when the product is fish, and the name of the manufacturer of a boxed lunch when the product is a prepared box lunch, for example. The store management server control unit 81 receives information indicating the processor of each product from appropriate terminals, and updates the content of the processor management data 83c accordingly.

The store management server control unit 81 in this embodiment also has a function for determining if a product was manufactured by the expected authorized processor, and if the processor is not the authorized processor, stores information indicating an unauthorized processor relationally to the identification information of the product in the processor management data 83c.

Recording Images on a Label

Figure 8A:
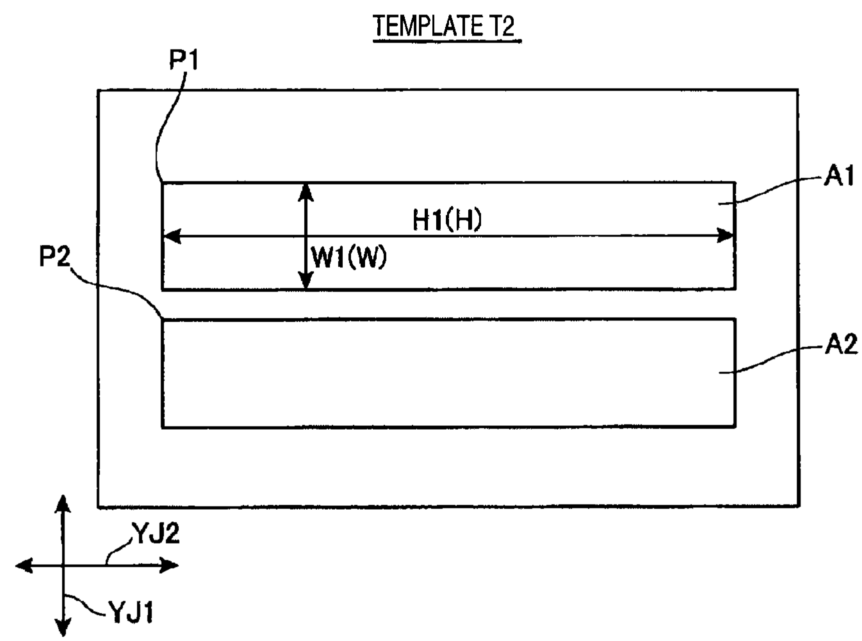
FIGS. 8A and 8B show examples of templates.
Figure 8B:
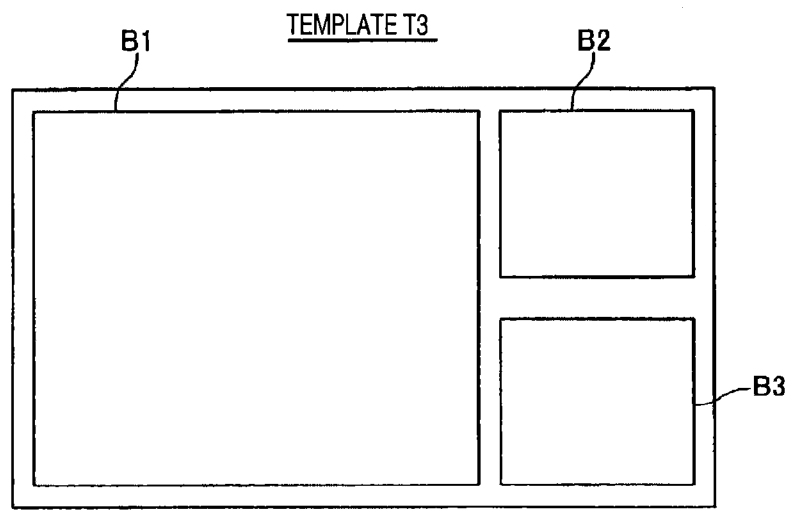
Figure 9:
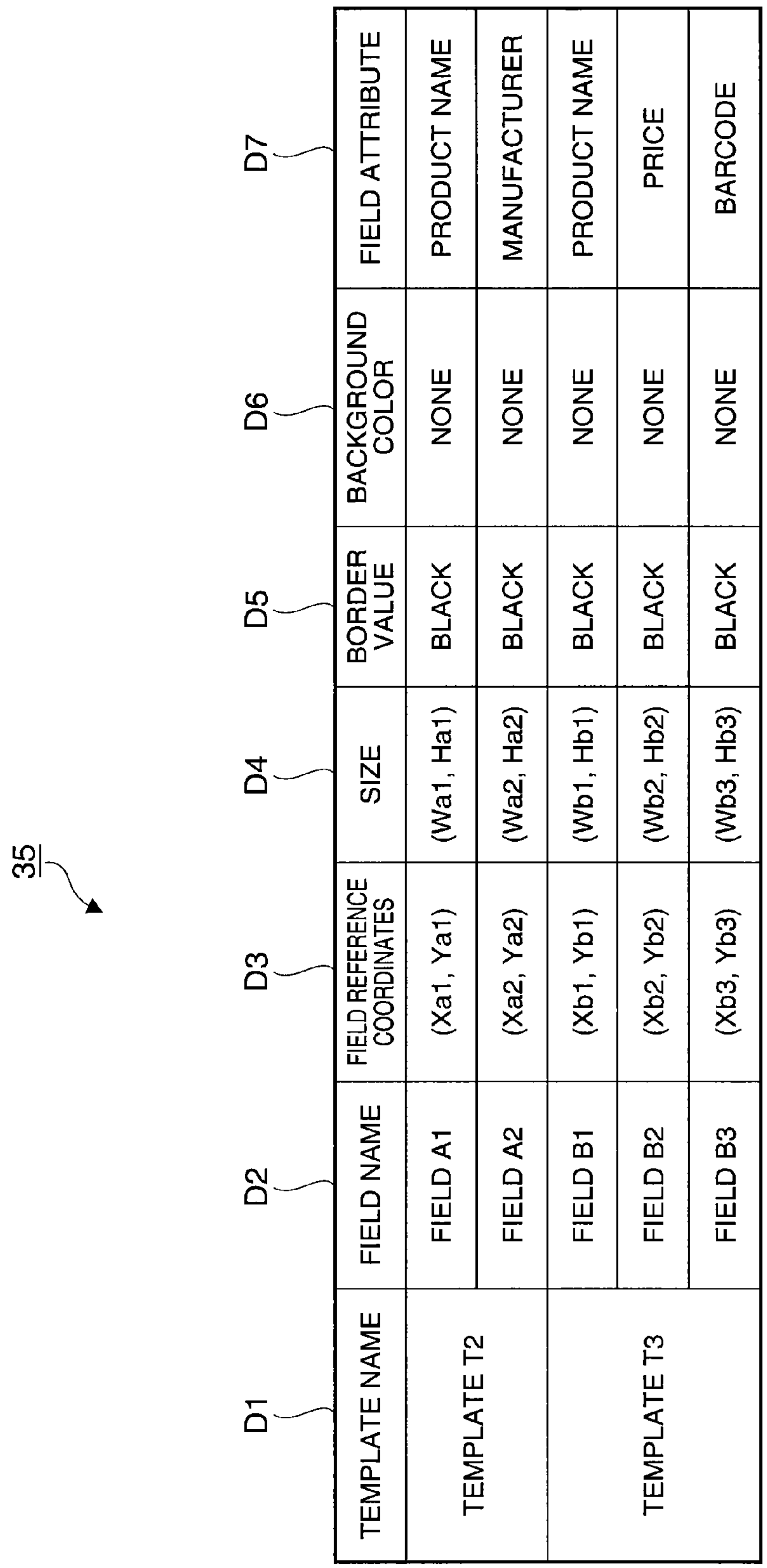
FIG. 9 shows the content of a template database.

Recording an image on a label using the recording control system described above is described below with reference to FIG. 8A, FIG. 8B, and FIG. 9. FIG. 8A and FIG. 8B show examples of a template, and FIG. 9 shows the content of a template database.

The printer 3 according to this embodiment of the invention records an image on a label according to a template as controlled by the host computer 2A.

FIG. 8A shows an example of a template, and more specifically shows template T2, which is one of plural preconfigured templates. As shown in FIG. 8A, the template T2 has two rectangular fields, fields A1 and A2, that are formed in a specific pattern in the recording area of the label. This template T2 is a template for a distribution label described above.

FIG. 8B shows an example of another template T3, which is different from template T2. As shown in FIG. 8B, this template T3 has three rectangular fields, fields B1 to B3, that are formed in a specific pattern in the recording area of the label. This template T3 is a template for a POS label described above.

The information related to each field in a template, and information defining each field, is defined for each template in a template database 35.

FIG. 9 schematically shows the data structure of a template database 35. FIG. 9 shows records for template T2 and template T3 shown in FIG. 8A and FIG. 8B. The template database in the example in FIG. 9 is a relational database, but the data structure of the template database 35 is not so limited.

The "template name", D1 field contains the name (identifier) uniquely assigned to a template.

The "field name", D2 fields contain the names (identification information) of the fields included in a template. As shown in FIG. 8A, template T2 has two fields A1 and A2. As shown in FIG. 9, the template database 35 therefore contains two field records, one for each of the two fields A1 and A2, related to template T2, and each record stores an appropriate name in the "field name" D2 field. Three records are also created for fields B1 to B3 in template T3, and each record stores an appropriate name in the "field name" D2 field.

The "field reference coordinates" D3 field contains the coordinates of a reference point for a respective field in a coordinate system of which the origin is a specific position in the recording area of the label. Any desired position in the recording area of the label can be specified using coordinates in this coordinate system. In this embodiment, the shape of each field in the recording area is a rectangle having two sides parallel to a first axis YJ1 of the label, and two sides parallel to a second axis YJ2, as shown in FIG. 8A or 8B. The origin of a field denotes a specific one of the four vertices of the field border. As indicated by vertex P1 of field A1 in FIG. 8A and vertex P2 of field A2 in FIG. 8A, the vertex at the top left of the four corners of each border is the origin in this embodiment.

The "size" D4 field contains information indicating the length W (i.e. width) of the field along axis YJ1, and the length H (i.e. height) of the field along axis YJ2. For example, information denoting length W1 and length H1 is stored as the "size" D4 field of D2 field "FIELD A1" in FIG. 8A. Because the fields are rectangular as described above, the position, shape, and size of each field in the recording area can be specifically determined using the field reference coordinates D3 and the size D4 fields.

The "border value" D5 field contains information describing the color of the border around the area of a field, such as A1. The printer 3 in this embodiment is a color printer, a border color can be specified for each field, and the border will be recorded on the label in the specified color. Note that the color of the border or the background described below can also be set to "none," that is, the border is not recorded or color is not added to the background described below.

The "background color" D6 field contains information identifying the color of the background in a field. For example, if information indicating blue is stored in the background information D6, the entire corresponding field will be printed blue.

The "field attribute" D7 field contains information about a specific field attribute. A field attribute is information expressing a feature, characteristic, or content, for example, of the image (information) recorded in the corresponding field.

As described above, template T2 is a template for labels that are affixed to products (e.g. commercial products) or product packaging after the products are produced as the products pass through the distribution channel from the manufacturer to the store. Field A1 in template T2 is the field where the product name is recorded, and the attribute for field A1 is "product name." Field A2 is the field where the manufacturer of the product is recorded, and the attribute of this field is "manufacturer."

Template T3 is a template for labels that are affixed to display shelves in the retail store. Field B1 in template T3 is the field where the product name is recorded, and the attribute for field B1 is "product name." Field B2 is the field where the price of the product is recorded, and the attribute of this field is "price." Field B3 is the field for recording a barcode used by store employees, and the attribute is "barcode."

As in the recording control system 1 according to the first embodiment of the invention, the terminal-side control unit 51 of the template terminal 5 has a function for generating the records in the template database 35 based on information stored in a template by the original printer 6. A corresponding record is therefore created in the template database 35 for each template that can be used by the original printer 6, and the new printer 3 can record images based on the templates used by the original printer 6.

More specifically, data in a specific format (the "original template data" below) including at least the template name, the name of each field in the template, and location and size information for each field is stored for each template that can be used by the original printer 6. For example, the original template data for the template on which template T2 is based includes at least template T2 as the template name, fields A1 and A2 as the field names, and information denoting the position and size of each of the fields A1 and A2. Other aspects of operation are the same as in the first embodiment, and further detailed description thereof is omitted.

Basic Operation of the Host Computer and Printer

The basic operation of the host computer 2A and printer 3 when recording an image on a label based on a template is also the same as in the first embodiment, and further detailed description thereof is omitted.

Example of Recording a Label

Figure 10:
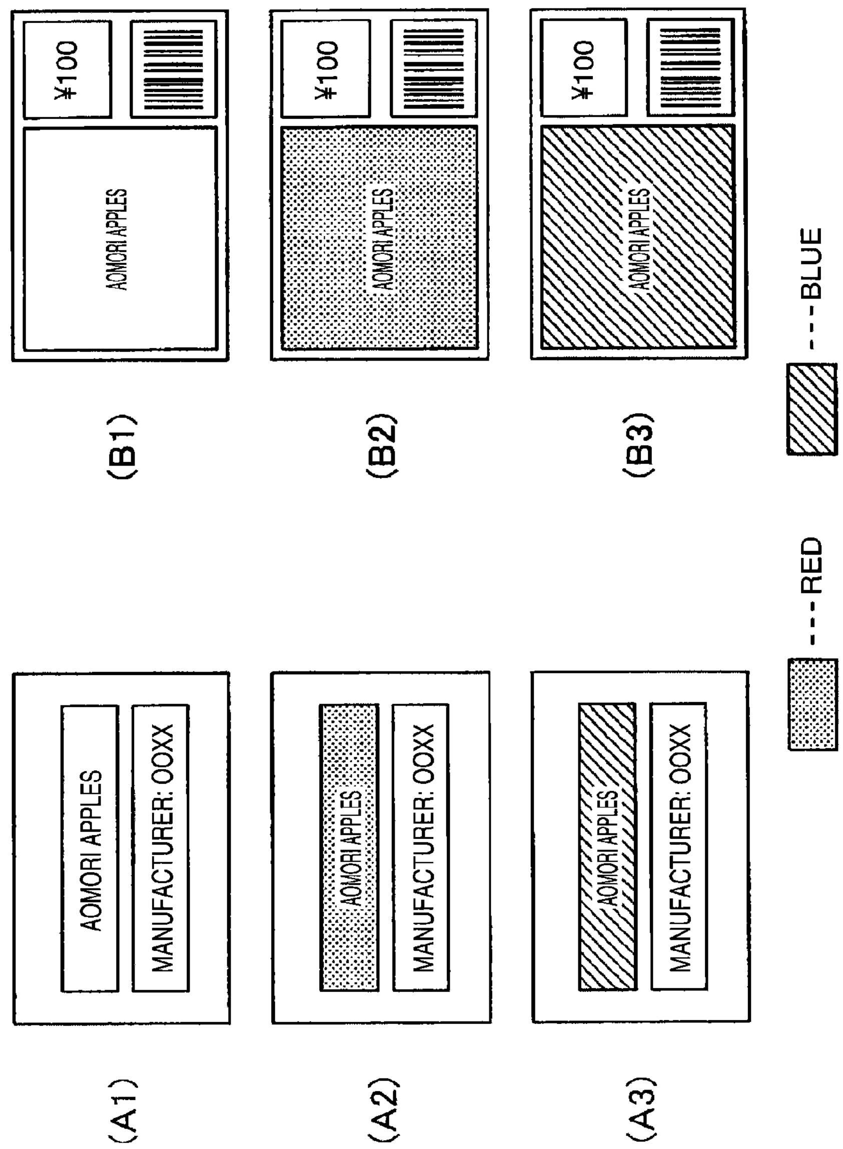
FIG. 10 shows an example of an image recorded based on a template.

An example of recording a label is described below with reference to FIG. 10. FIG. 10 shows examples of labels on which images are recorded according to a template.

In FIG. 10, A1 schematically shows an example of a label to which images are recorded based on template T2. In the example in FIG. 10 (A1), "Aomori apples" is recorded as the product name in field A1. Information identifying the producer is recorded in field A2.

FIG. 10 (B1) schematically shows an example of a label to which images are recorded based on template T3. In the example in FIG. 10 (B1), "Aomori apples" is recorded as the product name in field B1. Information identifying the producer is recorded in field A2. The price of the product, 100 yen, is recorded in field B2. A barcode containing the product code is recorded in field B3. This barcode can be read by a store employee using a barcode reader as needed.

The template terminal 5 in this embodiment of the invention thus acquires necessary information related to a template from the original printer 6, and based on the acquired information generates records in the template database 35. The template identification information (template name) and identification information (field names) for each field in the template managed by the original printer 6 are thus the same as the information managed by the printer 3. As a result, the printer 3 can appropriately manage the template to use and the template fields, and record images to a label based on the template, using the control commands that are output to the original printer 6.

The printer 3 can also desirably colorize the field borders and field background, and record images using a template based on a template that was used by the original printer 6, without changing the control commands output from the host computer 2A to the original printer 6, that is, without modifying the application program 21 or device driver 23.

Operation of Devices in the Recording Control System

When producing a label for any particular product, the recording control system 1A according to this embodiment of the invention changes the image recorded on the label according to the distribution status of the product, and thereby adds value to the printed label (the printout). The operation of the devices in this recording control system 1A when producing a label is described below.

Operation when Producing a Distribution Label

Figure 11:
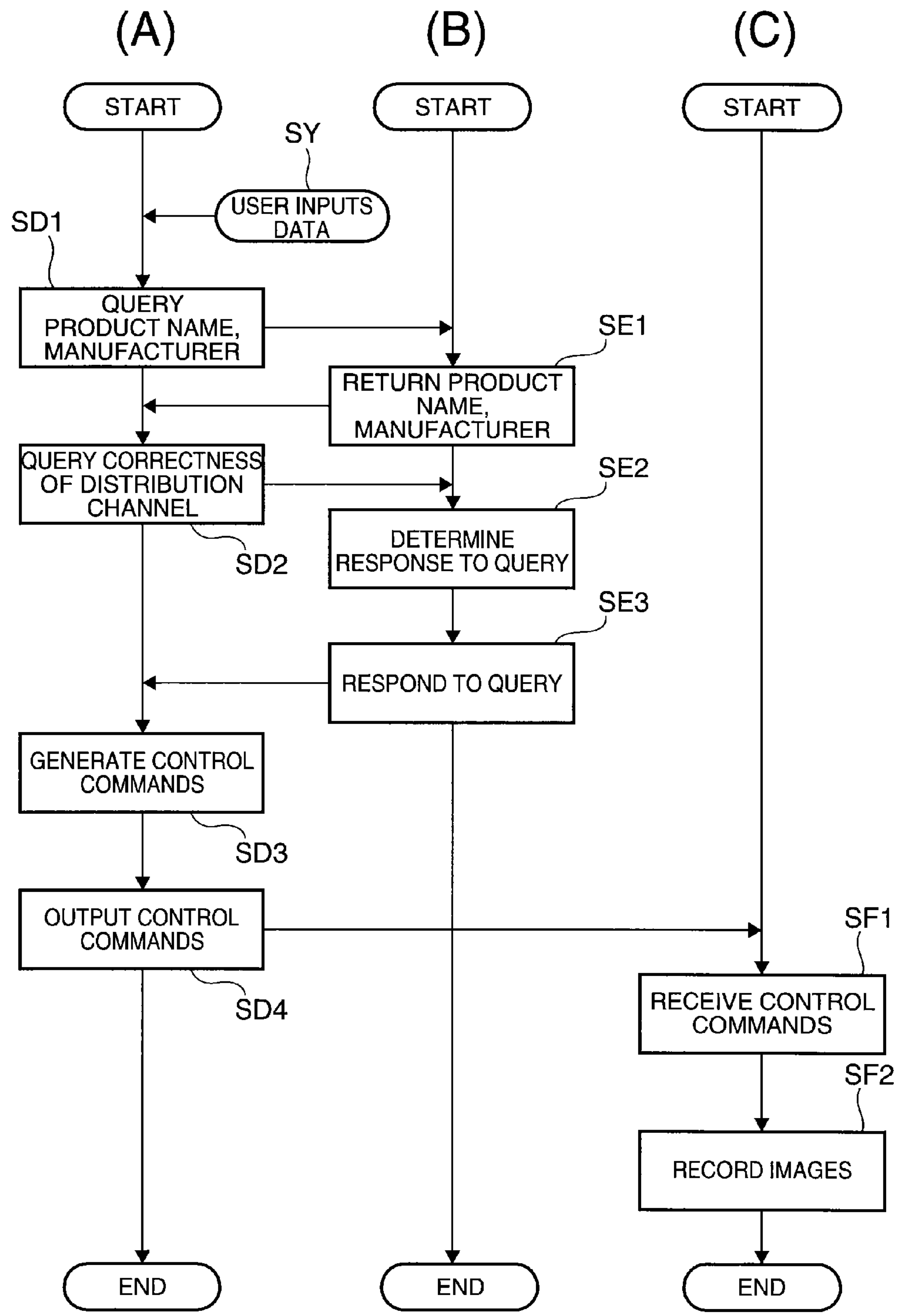
FIG. 11 is a flow chart showing the operation of devices in a recording control system when producing distribution labels.

Operation of devices in the recording control system 1A when producing a distribution label is described first with reference to FIG. 11. FIG. 11 is a flow chart showing the operation of devices in the recording control system when producing a distribution label, column (A) showing the operation of the host computer 2A, (B) showing the operation of the distribution management server 7A, and (C) the operation of the printer 3. In the following example, the host-side control unit 18 functions as the recording control unit. A distribution label is a label recorded with images according to the template T2 shown in FIG. 8A.

To produce a distribution label for any one product, the user inputs the name of the template to use (template T2 in this example), and identification information for the product for which to produce a label (step SY1). The application program 21 has a function that provides a user interface enabling the user to input the above information, and the user can easily and appropriately input the information through the user interface. The user interface, for example, enables the user to select a template name while viewing a preview of each template.

Once data input by the user is completed in step SY1, the host-side control unit 18 of the host computer 2A queries the distribution management server 7A for the name and manufacturer of the product using the input identification information as the search key (step SD1). The product name is the information to be recorded in field A1, and the manufacturer (producer) is the information to be recorded in field A2. In response to the query, the server-side controller 71 of the distribution management server 7A returns the product name and the manufacturer (step SE1).

Using the identification information of the desired product as the search key, the host-side control unit 18 of the host computer 2A then queries the distribution management server 7A to determine if (1) the product was shipped through the authorized distribution channel, (2) the storage limit was exceeded, (3) the product temperature exceeded the specified temperature limit, or (4) the product was manufactured by the correct manufacturer (step SD2). The protocol used for queries is predefined.

When a query is received, the distribution management server control unit 71A of the distribution management server 7A searches the distribution management database 72Aa stored on the inventory management database 72*a* and determines the response to each query (step SE2). More specifically, the distribution management server control unit 71A (1) references the distribution channel management data 73*a* to determine if the product identified by the specified identification information was shipped through the authorized distribution channel, and uses the result of the decision as the response. The distribution management server control unit 71A similarly references (2) the storage period management data 73*b* to determine if the product identified by the specified identification information was stored for longer than the storage limit; references (3) the storage temperature management data 73*c* to determine if the temperature of the product identified by the specified identification information exceeded the specified temperature limit; and references (4) the manufacturer management data 73*d* to determine if the product identified by the specified identification information was manufactured by the correct manufacturer. The result of each decision is used as the response to the corresponding query. Next, the distribution management server control unit 71A returns the responses (step SE3).

Note that the information returned by the distribution management server control unit 71A in step SE3 is distribution information related to distribution of a product, and more specifically is information related to the distribution channel of the product, the storage period, the storage temperature, and the authenticity of the manufacturer (producer).

When the query responses are received, the host-side control unit 18 of the host computer 2A generates control commands including the following commands (step SD3).

More specifically, if the identified product (1) was not shipped through the authorized distribution channel, the host-side control unit 18 generates a control command converting the background color of field A1 in template T2 to red. When the printer 3 records images on the label based on this control command, the background color of field A1 becomes red.

If (2) the identified product was stored for longer than the storage limit, the host-side control unit 18 generates a control command converting the background color of field A1 in template T2 to blue.

If (3) the temperature of the product or the storage temperature exceeded the temperature limit, the host-side control unit 18 generates a control command converting the background color of field A1 in template T2 to yellow.

If (4) the product was not manufactured by the authorized manufacturer, the host-side control unit 18 generates a control command converting the background color of field A1 in template T2 to green.

If plural conditions are met at the same time, the host-side control unit 18 generates a control command converting the background color of field A1 to a specific color. For convenience of description, however, a specific example of the command generated when plural conditions are met is omitted.

This embodiment of the invention thus changes the background color of a specific area (field) on the label to a specific color when there is a problem with the distribution channel of the product, the storage period, the storage temperature, or the authenticity of the manufacturer.

The effect of this embodiment of the invention is described below.

Specifically, by simply referring to the background color of a specific area of the label, the user can easily and accurately know that there is a problem with the distribution channel, the storage period, the storage temperature, or the authenticity of the manufacturer of the product. By changing the background color according to the specific problem, the user can also easily and accurately know if there is a problem with the distribution channel, the storage period, the storage temperature, or the authenticity of the manufacturer of the product by simply checking the color of the background of the specific area.

This embodiment of the invention can thus add value to the printout to achieve the above effect.

In step SD4, the host-side control unit 18 sends the generated control commands to the printer 3.

When the host computer 2A sends the control commands to the printer 3, the recording execution unit 32 of the printer 3 receives the control commands (step SF1), and based on the control commands controls parts and devices of the recording unit 39 to record the images on a label based on template T2 (step SF2).

FIG. 10 (A2) shows an example of images recorded on a label in step SF2 when the product did not pass through the authorized distribution channel, that is, when the product distribution channel is wrong. In this event, the background color of field A1 in template T2 is printed red as shown in the figure because a command that converts the color of the background of field A1 to red is contained in the control commands. The effect of this is as described above.

FIG. 10 (A3) shows an example of the images recorded on the label in step SF2 when the storage time of the product exceeded the limit, that is, when there is a problem with the storage time of the product. In this event, the background color of field A1 in template T2 is printed blue as shown in the figure because a command that converts the color of the background of field A1 to blue is contained in the control commands. The effect of this is as described above.

Operation when Producing a POS Label

Operation of devices in the recording control system 1A when producing a POS label is described next with reference to FIG. 12.

Figure 12:
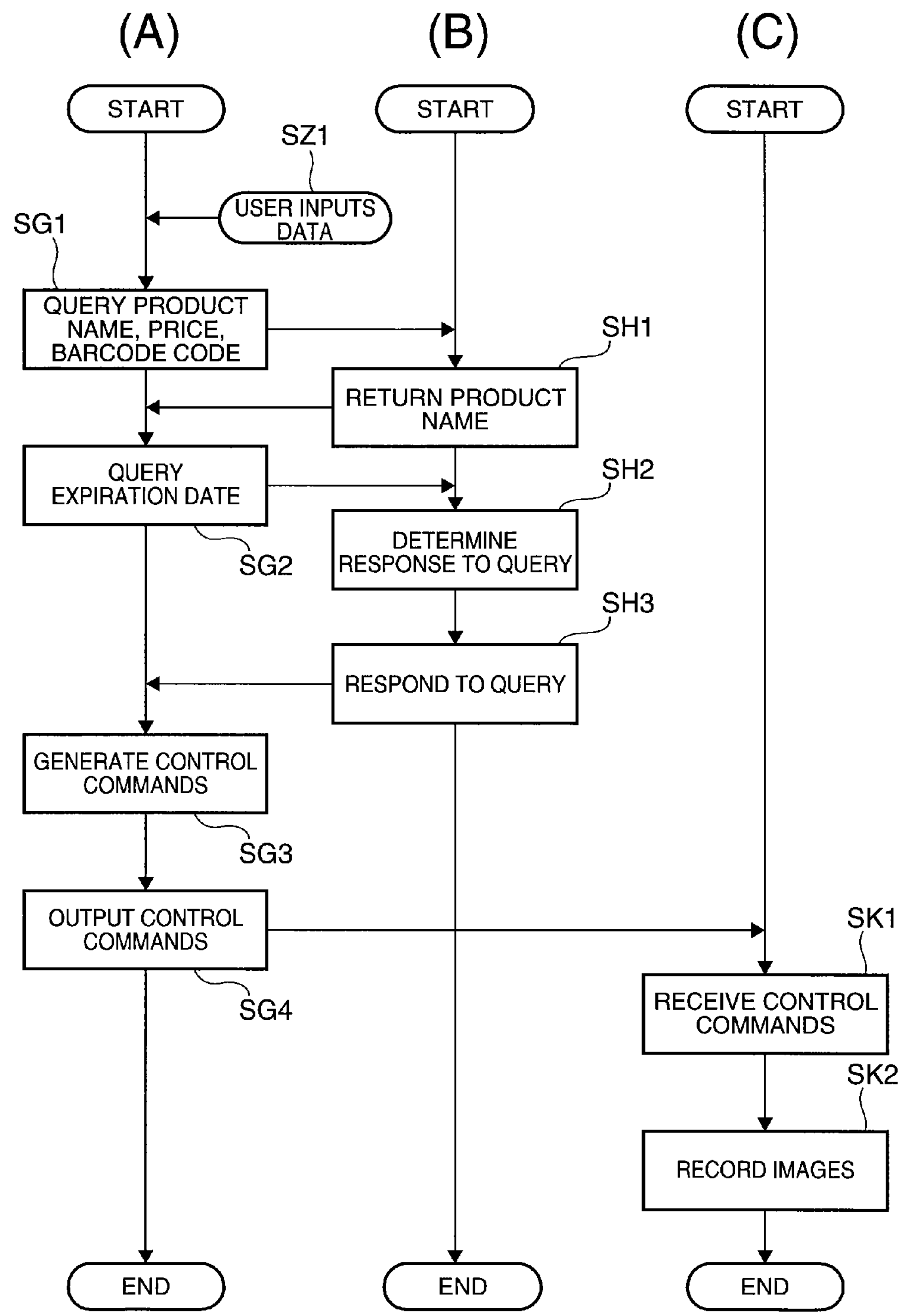
FIG. 12 is a flow chart showing the operation of devices in a recording control system when producing shelf labels.

FIG. 12 is a flow chart showing the operation of devices in the recording control system when producing a POS label, column (A) showing the operation of the host computer 2A, (B) showing the operation of the store management server 8, and (C) the operation of the printer 3. In the following example, the host-side control unit 18 functions as the recording control unit. A POS label is a label recorded with images according to the template T3 shown in FIG. 8B.

To produce a POS label for any one product, the user inputs the name of the template to use (template T3 in this example), and identification information for the product for which to produce a label (step SZ1).

Once data input by the user is completed in step SZ1, the host-side control unit 18 of the host computer 2A queries the store management server 8 for the name, price, and barcode code of the product using the input identification information as the search key (step SG1). The product name is the information to be recorded in field B1, the price is the information to be recorded in field B2, and the barcode code is an image of the barcode to be recorded in field B3. In response to the query, the store management server control unit 81 of the store management server 8 returns the product name, price, and barcode code (step SH1).

Using the identification information of the desired product as the search key, the host-side control unit 18 of the host computer 2A then queries the store management server 8 to determine (1) if the expiration date of the product is near, and (2) if the processor is the correct processor (step SG2). The protocol used for queries is predefined.

When a query is received, the store management server control unit 81 of the store management server 8 searches the store management database 82*a* stored in the store management server storage unit 82 and determines the response to each query (step SH2). More specifically, the store management server control unit 81 (1) references the expiration date management data 83*b* to determine if the expiration date of the product is near, and (2) references the processor management data 83*c* to determine if the processor is the correct processor, and uses the results of the decisions as the responses to the queries. Next, the store management server control unit 81 returns the responses (step SH3).

Note that the information returned by the store management server control unit 81 in step SH3 is distribution information related to distribution of a product, and more specifically is information related to the expiration date or information related to the expiration date of the product, and the authenticity of the processor.

When the query responses are received, the host-side control unit 18 of the host computer 2A generates control commands including the following commands (step SG3).

More specifically, if the identified product (1) is near the expiration date, the host-side control unit 18 generates a control command converting the background color of field B1 in template T3 to red. When the printer 3 records images on the label based on this control command, the background color of field B1 becomes red.

If (2) the processor of the identified product is not correct, the host-side control unit 18 generates a control command converting the background color of field B1 in template T3 to blue.

This embodiment of the invention thus changes the background color of a specific area (field) on the label to a specific color when there is a problem with the expiration date of the product, or the authenticity of the processor.

The effect of this embodiment of the invention is described below.

Specifically, by simply referring to the background color of a specific area of the label, the user can easily and accurately know if the expiration date of the product is near, or there is a problem with the authenticity of the processor. By changing the background color according to the specific problem, the user can also easily and accurately know if the expiration date of the product is near, or there is a problem with the authenticity of the processor, by simply checking the color of the background of the specific area.

This embodiment of the invention can thus add value to the printout to achieve the above effect.

In step SG4, the host-side control unit 18 sends the generated control commands to the printer 3.

When the host computer 2A sends the control commands to the printer 3, the recording execution unit 32 of the printer 3 receives the control commands (step SK1), and based on the control commands controls parts and devices of the recording unit 39 to record the images on a label based on template T3 (step SK2).

FIG. 10 (B2) shows an example of images recorded on a label in step SK2 when the expiration date of the product is near. In this event, the background color of field B1 in template T3 is printed red as shown in the figure because a command that converts the color of the background of field B1 to red is contained in the control commands. The effect of this is as described above.

FIG. 10 (B3) shows an example of the images recorded on the label in step SK2 when the processor of the product (i.e. product processor) is not correct (i.e. not an approved product processor). In this event, the background color of field B1 in template T3 is printed blue as shown in the figure because a command that converts the color of the background of field B1 to blue is contained in the control commands. The effect of this is as described above.

This fourth example simply describes one embodiment of the invention, and can be modified and adapted as desired without departing from the scope of the invention.

More specifically, this fourth embodiment changes the color of the background of a specific area of the template that is used to a specific color when specific distribution conditions are met. However, the invention is not so limited, and the color of the border around a specific area could be changed, or the color of the background and the color of the border of a specific area could be changed to respective colors, instead. In these cases, effects similar to changing the color of the background to a specific color can also be achieved.

As described above, the printer 3 in this embodiment of the invention has an inkjet head 39*a* capable of color printing, a printer-side storage unit 33 (storage unit) that stores area definition data defining the recording areas in each of a plurality of templates comprising one or a plurality of areas that are formed in the printable area of a label used as the recording medium, and a recording execution unit 32 that controls the inkjet head 39*a* based on the area definition data for each field in the specified template to record the images in each field according to the template when control commands that specify a particular template and instruct recording images in the areas of the specified template are received from the host computer 2A.

In order to record images related to one product on labels according to a particular template with the printer 3, the host computer 2A has a host-side control unit 18 (recording control unit) that acquires distribution information related to the distribution (shipping) of the one product (including as described above information indicating whether or not the product was shipped through official channels, and information indicating whether or not the expiration date of the product is approaching), and generates and outputs control commands including information for changing the color of a specific area (field) in the template to a specific color based on the distribution information.

Thus comprised, the color of a specific area in the template is changed to and recorded using a specific color based on the distribution information related to the distribution of the product. As a result, by simply seeing the color of a specific area amongst the plural areas formed on a label, the user can easily and reliably acquire information related to the distribution of the product, and user convenience can be improved. More specifically, value can be added to the printout.

The distribution information acquired by the host computer 2A in this embodiment includes information related to the correctness of at least one of the distribution channel, the storage time, the storage temperature, and the manufacturer of the product, and when recording images related to one product on a label according to a particular template with the printer 3, the host-side control unit 18 functioning as the recording control unit acquires the distribution information, and generates and outputs control commands including information for changing the color of a specific area (field) in the template to a specific color based on the correctness of the distribution channel, the storage time, the storage temperature, or the manufacturer of the product.

As a result, by simply seeing the color of a specific area amongst the plural areas formed on a label, the user can easily and reliably acquire information related to the correctness of the distribution channel, the storage time, the storage temperature, or the manufacturer of the product, and user convenience is thus improved.

The distribution information acquired by the host computer 2A in this embodiment also includes information related to the correctness of at least one of the expiration date and the processor of the product, and when recording images related to one product on a label according to a particular template with the printer 3, the host-side control unit 18 functioning as the recording control unit acquires the distribution information, and generates and outputs control commands including information for changing the color of a specific area (field) in the template to a specific color based on the correctness of the expiration date or the processor of the product.

As a result, by simply seeing the color of a specific area amongst the plural areas formed on a label, the user can easily and reliably acquire information related to the correctness of the expiration date or the processor of the product, and user convenience is thus improved.

A process that changes the background color of a specific area to a specific color is executed in this embodiment as a process that changes the color related to a specific area to a specific color.

With this embodiment, the color related a particular area can be effectively changed to a specific color by using the ability to record according to a template composed of one or a plurality of areas (fields).

As described above, a configuration that changes the color of the border of a specific area to a specific color is also conceivable.

Embodiment 5

A fifth embodiment of the invention is described next.

In the fourth embodiment described above, the host computer 2A acquires information related to the distribution of a product, and the host-side control unit 18 of the host computer 2A generates and sends to the printer 3 control commands including information for changing the color related to a specific area in a template to a specific color for printing when a specific condition is met.

In this embodiment, the printer-side control unit 30 of the printer 3 acquires information related to the distribution of the product, and converts the color of a specific area in the template that is used to a specific color when recording. The method whereby the printer-side control unit 30 acquires the information related to the distribution of the product can be the method described in the fourth embodiment. More specifically, the printer-side control unit 30 could query the distribution management server 7A or the host computer 2A, or data related to product distribution could be stored in the printer 3, and the printer-side control unit 30 could acquire the information related to product distribution based on this local data. In this embodiment, the printer-side control unit 30 functions as the recording control unit.

This example simply describes one embodiment of the invention, and can be modified and adapted as desired without departing from the scope of the invention.

Furthermore, the function blocks shown in FIG. 7 can be achieved by the cooperation of hardware and software, and do not suggest a particular hardware configuration. The functions of the function blocks of the host computer 2A and printer 3 can also be rendered by a separate device externally connected to the host computer 2A or printer 3. The host computer 2A and printer 3 could also execute the operations described above by running a program stored on an externally connected storage medium.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An image recording system comprising:

a host device configured to have initial product data identifying a specific product; and an image recording device responsive to the host device for recording product information on an image recording medium in accordance with said initial product data provided by the host device and a selected one of a plurality of image layout templates, the selected template being specified by the host device, the image recording device including:

(a) a storage storing said plurality of templates, each template in said plurality of image layout templates having at least one imaging region where information may be recorded, each of said at least one imaging region being defined by a respective set of area definition data fields that define a recording area of the imaging region within the image recording medium, said area definition data fields including default settings, and (b) a recording processor that controls recording on the image recording medium said product information according to said received initial product data and the area definition data fields of the selected template;

wherein said host device includes a data processor that acquires secondary descriptive data related to said specific product in addition to said initial product data, and prior to said image recording device recording said product information on said image recording medium using the selected template, said data processor selectively instructs said image recording device to alter the default settings of at least one data field within the respective set of area definition data fields of at least one imaging region of the selected template to alternate settings that reflect information extracted from said secondary descriptive data, and to record said product information on said image recording medium using the selected template with the alternate settings.

2. The image recording system described in claim 1, wherein:

the image recording device has a recording head capable of color printing; and said secondary descriptive data includes inventory information related to the inventory of the specific product, and said data processor instructs said image recording device to alter a default color setting of said at least one imaging region of the selected template to an alternate color setting indicative of the inventory status of the specific product as determined from said inventory information.

3. The image recording system described in claim 2, wherein:

said secondary descriptive data is acquired from a data store within the host device;

said specific product is a commercial product; and said alternate settings are predefined within the selected template.

4. The image recording system described in claim 2, wherein:

said secondary descriptive data is acquired from a remote server that manages product inventory.

5. The image recording system described in claim 2, wherein:

said secondary descriptive data includes the rate of decrease in the inventory of said specific product, and said data processor instructs said image recording device to alter a default color setting of said at least one imaging region of the selected template to an alternate color setting indicative of the rate of decrease in the inventory of said specific product.

6. The image recording system described in claim 5, wherein:

said secondary descriptive data is acquired from a remote server that manages product inventory, and calculates the rate of decrease in the inventory of the specific product based on product inventory information acquired from the remote server; and said data processor instructs said image recording device to alter a default color setting of said at least one imaging region of the selected template to an alternate color setting indicative of the inventory status of the specific product as determined from said inventory information.

7. The image recording system described in claim 2, wherein:

within said at least one imaging region, at least one of its border or background is altered from its default color setting to said alternate color setting.

8. The image recording system described in claim 1, wherein:

the image recording device has a recording head capable of color printing; and said secondary descriptive data includes distribution information related to the distribution of said specific product, and said data processor instructs said image recording device to alter a default color setting of said at least one imaging region of the selected template to an alternate color setting indicative of the distribution information.

9. The image recording system described in claim 8, wherein:

the distribution information includes information related to whether the distribution path of said specific product met requirements of at least one of the distribution channel, storage time, storage temperature, or manufacturer of the product; and said data processor instructs said image recording device to alter a default color setting of said at least one imaging region of the selected template to an alternate color setting indicative of whether the distribution path of said specific product met requirements of distribution channel, storage time, storage temperature, or manufacturer of the product.

10. The image recording system described in claim 8, wherein:

said secondary descriptive data includes information related to the expiration date and the product processor of the specific product; and said data processor instructs said image recording device to alter a default color setting of said at least one imaging region of the selected template to an alternate color setting indicative of the proximity of the expiration date or the specific produced was processed by an approved product processor.

11. The image recording system described in claim 8, wherein:

within said at least one imaging region, at least one of its border or background is altered from its default color setting to said alternate color setting.

12. An image recording device that is responsive to a host device, and records on a recording medium an image related to a commercial product as directed by the host device, the image recording device comprising:

a storage storing a plurality of image layout templates, each template of said plurality of image layout templates having at least one imaging region where information may be recorded, each of said at least one imaging region being defined by a respective set of area definition data fields that define a recording area of the imaging region within the image recording medium, said area definition data fields including default settings; and a recording processor that, in response to the host device directing the image recording device to follow a specified one of said templates to record on the recording medium a first set of descriptive data related to said commercial product and provided by the host device, acquires a second set of descriptive data related to said commercial product, and based on the second set of descriptive data selectively alters the default settings of at least one data field within the respective set of area definitions of at least one imaging region of the specified template to alternate settings that reflect information extracted from said second set of description data, and records said first set of descriptive data on said image recording medium according to the specified template with the alternate settings.

13. The image recording device described in claim 12, further comprising:

a recording head capable of color printing;

said second set of descriptive data includes inventory information of said commercial product; and said recording processor alters a default color setting of said at least one imaging region of the specified template to an alternate color setting indicative of the inventory status of the commercial product as determined from said inventory information.

14. The image recording device described in claim 13, wherein:

within said at least one imaging region, at least one of its border or background is altered from its default color setting to said alternate color setting.

15. The image recording device described in claim 12, further comprising:

a recording head capable of color printing; and said second set of descriptive data includes distribution information related to the distribution of said commercial product, and said recording processor alters a default color setting of said at least one imaging region of the specified template to an alternate color setting indicative of the distribution information.

16. The image recording device described in claim 15, wherein:

within said at least one imaging region, at least one of its border or background is altered from its default color setting to said alternate color setting.

17. A control method of an image recording control system including a host device in communication with an image recording device that records on a recording medium an image related to a commercial product as directed by the host device, the control method comprising the following steps:

(A) storing within the image recording device a plurality of image layout templates, each template of said plurality of image layout templates having at least one imaging region where information may be recorded, each of said at least one imaging region being defined by a respective set of area definition data fields that define a recording area of the imaging region within the image recording medium, said area definition data fields including default settings;

(B) submitting a first set of descriptive data related to said commercial product to the host device and identifying one template within said plurality of image layout templates;

(C) having said host device generate first image data representative of said first set of descriptive data and arranged for recording in accordance with the identified template;

(D) having said host device access a second set of descriptive data related to said commercial product, and based on the second set of descriptive data selectively altering the default setting of at least one data field within the respective set of area definition data fields of at least one imaging region of the identified template to alternate settings that reflect information extracted from said second set of description data;

(E) having the host device transmit recording commands to the image recording device, said recording commands directing the image recording device to record said first image data in accordance with the identified template and alternate settings; and (F) in response to receiving said recording commands, having said image recording device record said on said recording medium said first image data in accordance with the identified template and alternate settings.

18. The control method of an image recording control system described in claim 17, wherein:

the image recording device has a recording head capable of color printing;

said second set of descriptive data includes inventory information of said commercial product; and in step (D), said host device selectively alters a default color setting of said at least one imaging region of the identified template to an alternate color setting indicative of the inventory status of the commercial product as determined from said inventory information.

19. The control method of an image recording control system described in claim 17, wherein:

the image recording device has a recording head capable of color printing; and said second set of descriptive data includes distribution information related to the distribution of said commercial product, and in step (D), said host device selectively alters a default color setting of said at least one imaging region of the identified template to an alternate color setting indicative of the distribution information.

* * * * *